(12) United States Patent
Okamoto et al.

(10) Patent No.: US 8,810,662 B2
(45) Date of Patent: Aug. 19, 2014

(54) IMAGE PROCESSING SYSTEM INCLUDING PORTABLE TERMINAL

(75) Inventors: Tomoyuki Okamoto, Kyoto (JP); Nobuo Kamei, Osaka (JP); Yasuji Takeuchi, Kobe (JP); Takeshi Maekawa, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 20 days.

(21) Appl. No.: 13/350,314

(22) Filed: Jan. 13, 2012

(65) Prior Publication Data

US 2012/0182432 A1    Jul. 19, 2012

(30) Foreign Application Priority Data

Jan. 14, 2011 (JP) ................................ 2011-006058

(51) Int. Cl.
*H04N 5/225* (2006.01)
*H04N 5/232* (2006.01)
*H04N 5/228* (2006.01)

(52) U.S. Cl.
USPC ............... 348/207.2; 348/211.1; 348/211.2; 348/211.3; 348/211.4; 348/207.1; 348/208.2; 348/208.3

(58) Field of Classification Search
USPC ........ 348/333.12, 207.1, 207.2, 211.1–211.4, 348/208.2, 208.3; 358/1.15; 710/62; 715/274
See application file for complete search history.

(56) References Cited

U.S. PATENT DOCUMENTS

| | | | | |
|---|---|---|---|---|
| 6,750,902 | B1* | 6/2004 | Steinberg et al. | 348/211.3 |
| 6,806,978 | B1* | 10/2004 | Tamura et al. | 358/1.15 |
| 7,834,906 | B2* | 11/2010 | Silverbrook et al. | 348/207.2 |
| 2005/0062851 | A1* | 3/2005 | Silverbrook et al. | 348/207.2 |
| 2005/0083548 | A1* | 4/2005 | Suga et al. | 358/1.13 |
| 2006/0001757 | A1* | 1/2006 | Sawachi | 348/333.12 |
| 2006/0013630 | A1* | 1/2006 | Silverbrook et al. | 400/62 |
| 2007/0097428 | A1* | 5/2007 | Yamada et al. | 358/1.15 |
| 2007/0174521 | A1* | 7/2007 | Aritomi | 710/62 |
| 2012/0008161 | A1* | 1/2012 | Rouhana | 358/1.15 |

FOREIGN PATENT DOCUMENTS

| | | | | |
|---|---|---|---|---|
| JP | 2004-23449 | | 1/2004 | |
| JP | 2004-96627 | | 3/2004 | |
| JP | 2004-234218 | | 8/2004 | |
| JP | 2004-318431 | | 11/2004 | |
| JP | 2006-91390 | | 4/2006 | |
| JP | 2006195765 | A * | 7/2006 | ............... G06F 3/12 |
| JP | 2007-318519 | | 12/2007 | |
| JP | 2010-219879 | | 9/2010 | |

OTHER PUBLICATIONS

Notice of Grounds of Rejection mailed Apr. 23, 2013, directed to JP Application No. 2011-006058; 5 pages.

* cited by examiner

*Primary Examiner* — Nhan T Tran
*Assistant Examiner* — Xi Wang
(74) *Attorney, Agent, or Firm* — Osha Liang LLP

(57) ABSTRACT

In an image processing system, a portable terminal obtains positional information and orientation information of the portable terminal and transmits these to an information processing apparatus. An image processing apparatus generates information specifying a process executable by the apparatus itself at the present moment and transmits the generated information to the information processing apparatus. The information processing apparatus stores positional information and functional information for specifying a process to be executed, for each image processing apparatus. Upon receiving the positional information and orientation information from the portable terminal, the information processing apparatus transmits, to the portable terminal, the functional information for specifying a process to be executed by a specific image processing apparatus associated with the received information.

16 Claims, 27 Drawing Sheets

FIG.11

| MFP NAME | POSITIONAL INFORMATION | | | COMMUNICATION INFORMATION | | FUNCTIONAL INFORMATION | |
|---|---|---|---|---|---|---|---|
| | LONGITUDE | LATITUDE | ALTITUDE | IP ADDRESS | Bluetooth ADDRESS | BOX FUNCTION | SCAN FUNCTION |
| MFP1 | 135° x1'x1" xxx1 East | 35° x1'x1" xxx1 North | 15m | vv. vv. vv. vv | vv. vv. vv. vv. vv. vv | YES | NO |
| MFP2 | 135° x2'x2" xxx2 East | 35° x2'x2" xxx2 North | 40m | aa. aa. aa. aa | www. ww. ww. ww. ww. ww | NO | YES |
| MFP3 | 135° x3'x3" xxx3 East | 35° x3'x3" xxx3 North | 5m | bb. bb. bb. bb | xx. xx. xx. xx. xx. xx | YES | NO |
| MFP4 | 135° x4'x4" xxx4 East | 35° x4'x4" xxx4 North | 32m | cc. cc. cc. cc | yy. yy. yy. yy. yy. yy | YES | YES |
| . . . . | | | | | | | |

FIG.18

```
<reqinfo>
<gps>
  <gps-xpos> 34.858893 </gps-xpos>
  <gps-ypos> 135.725031 </gps-ypos>
</gps>
<dir> 232.000005 </dir>
</reqinfo>
```

FIG.19

| MFP NAME | MANUFACTURER | MODEL NO. | PRINT SPEED (MONOCHROME) (ppm) | PRINT SPEED (COLOR) (ppm) |
|---|---|---|---|---|
| KM01XXX | AAA | C652DS | 65 | 50 |
| : | : | : | : | : |

FIG.20

```
<mfpinfo>
<gps>
  <gps-xpos> 34.858873 </gps-xpos>
  <gps-ypos> 135.725133 </gps-ypos>
</gps>
<model>
  <main> C652DS </main>
  <maker> AAA </maker>
  <speed> 65ppm </speed>
  <speed-c> 50ppm </speed-c>
  <productid> KM01XXX </productid>

:

<dir> 232.000005 </dir>
<status> Ready </status>
<ipaddress> vv.vv.vv.vv. </ipaddress>
<bladdress> ww.ww.ww.ww.ww.ww. </bladdress>
</mfpinfo>
```

```
<reqmenu>
  <productid> KM01XXX </productid>
</reqmenu>
```

```
<menuinfo>
<menuhtml>
  <FORM name=f action=http://192.168.0.101/mfpmenu>
    <INPUT type=submit value=print instruction name=btnPrint>
    <BR>
    <INPUT type=submit value=box operation name=btnBox>
  </FORM>

</menuhtml>
</menuinfo>
```

```
<menuinfo>
<menuhtml>
<FORM enctype="multipart/form-data" method="POST" action="/PrintJob.CGI">
FILE NAME
  <INPUT type=file name=File value=PrintJob>
  <INPUT type=submit name=Sendprt value=send job>
</FORM>
```

```
<jobfile>
<filename> Documen.pdf </filename>
<type> application/pdf </type>
<data>

(ACTUAL FILE DATA)

</data>
</jobfile>
```

FIG.32

| JOB ID | USER ID | NUMBER OF PRINT PAGES |
|---|---|---|
| 000001 | TAKEUCHI | 4 |
| 000002 | IIDA | 2 |
| 000003 | KAMEI | 2 |
| : | : | : |

IMAGE PROCESSING SYSTEM INCLUDING PORTABLE TERMINAL

This application is based on Japanese Patent Application No. 2011-006058 filed with the Japan Patent Office on Jan. 14, 2011, the entire content of which is hereby incorporated by reference.

BACKGROUND OF THE INVENTION

1. Field of the Invention

The present invention relates to an image processing system and an image processing system including a portable terminal, and more particularly to an image processing system, an image processing apparatus and a method of controlling the same, an information processing apparatus and a method of controlling the same, and a recording medium encoded with a control program for a portable terminal.

2. Description of the Related Art

Image processing apparatuses such as copiers, printers, and MFPs (Multi-Functional Peripherals) including those functions are often used in office environments. Many users have opportunities to use those apparatuses.

On the other hand, with the recent widespread use of portable terminals, many users receive a variety of services using portable terminals such as mobile phones having a function of connecting to a network such as the Internet. As an example of the services, a file saved in a portable terminal is transmitted to an image processing apparatus via a network to allow the image processing apparatus to do, for example, printing of the file.

Among mobile phones or any other portable terminals, those having a camera function and a position detection function in combination with a communication function are also popular. As for the technique concerning such portable terminals having a camera function, a position detection function, and a communication function, for example, Japanese Laid-Open Patent Publication No. 2004-023449 (Document 1) discloses a digital camera, which obtains image information by taking a photo, obtains positional information at the location where the image information is obtained, and obtains accompanying information based on the position information via a network, so that the image information is associated with accompanying information.

When processing on a file saved in a portable terminal as described above is executed by an image processing apparatus, the portable terminal should have the function for allowing it to perform such processing. Specifically, the portable terminal should include application or any other similar function to interface with the image processing apparatus for allowing it to execute processing such as printing a file.

However, although the users may wish to execute such processing with any image processing apparatus installed at the places where they are with portable terminals, it is substantially impossible to provide their portable terminals with the interfaces for all image processing apparatuses.

SUMMARY OF THE INVENTION

The present invention is made in view of such situations. An object of the present invention is to allow mobile users carrying portable terminals to utilize image processing apparatuses at the places where they are.

In accordance with an aspect of the present invention, an image processing system includes a portable terminal, one or more image processing apparatuses executing one or more kinds of processes, and an information processing apparatus. The portable terminal includes a shooting unit, an obtaining unit for obtaining positional information and orientation information of the portable terminal, a display unit, and a first transmission unit for transmitting positional information and orientation information at a time of shooting by the shooting unit to the information processing apparatus. The information processing apparatus includes a storage unit for storing, for each of one or more image processing apparatuses, positional information and functional information for specifying a process to be executed by the image processing apparatus, a search unit for searching for a specific image processing apparatus which is an image processing apparatus included in a shot image by the shooting unit of the portable terminal, from one or more image processing apparatuses stored in the storage unit, based on the positional information and orientation information at a time of shooting that is received from the portable terminal, and a second transmission unit for transmitting the functional information of the specific image processing apparatus to the portable terminal. The portable terminal further includes a display control unit for allowing the display unit to display the shot image at a time of shooting by the shooting unit and a menu image including an operation unit for designating a process specified by the functional information. Each image processing apparatus includes a generation unit for generating information specifying a process executable at a present time in reflection to a status of the image processing apparatus, and a third transmission unit for transmitting the information generated by the generation unit to the information processing apparatus. The information processing apparatus includes an update unit for updating a stored content in the storage unit such that the functional information is associated only with the executable process received from the image processing apparatus.

In accordance with an aspect of the present invention, an information processing apparatus is included in an image processing system configured to include a portable terminal having a shooting unit, one or more image processing apparatuses executing one or more kinds of processes, and the information processing apparatus. The information processing apparatus includes: a storage unit for storing, for each of one or more image processing apparatuses, positional information and functional information for specifying a process to be executed by the image processing apparatus; and a reception unit for receiving positional information and orientation information at a time of shooting by the shooting unit from the portable terminal. The reception unit receives information specifying a process executable at a present time by each of one or more image processing apparatuses. The information processing apparatus further includes: an update unit for updating a stored content in the storage unit such that the functional information is associated only with the process executable at a present time by each of one or more image processing apparatuses that is received by the reception unit; a search unit for searching for a specific image processing apparatus which is an image processing apparatus included in a shot image by the shooting unit of the portable terminal, from the positional information of one or more image processing apparatuses that is stored in the storage unit, based on the positional information and orientation information at a time of shooting that is received from the portable terminal; and a transmission unit for transmitting the functional information of the specific image processing apparatus to the portable terminal.

In accordance with an aspect of the present invention, provided is a method of controlling an information processing apparatus included in an image processing system configured to include a portable terminal having a shooting unit, one or more image processing apparatuses executing one or more kinds of processes, and the information processing apparatus. The method includes the steps of: the information processing apparatus storing, for each of one or more image processing apparatuses, positional information and functional information for specifying a process to be executed by the image processing apparatus, in a storage unit, receiving positional information and orientation information at a time of shooting by the shooting unit from the portable terminal, receiving information specifying a process executable at a present time by each of one or more image processing apparatuses, updating a stored content in the storage unit such that the functional information is associated only with the received process executable at a present time for each of one or more image processing apparatuses, searching for a specific image processing apparatus which is an image processing apparatus included in a shot image by the shooting unit of the portable terminal, from the positional information of one or more image processing apparatuses that is stored in the storage unit, based on the positional information and orientation information at a time of shooting that is received from the portable terminal, and transmitting the functional information of the specific image processing apparatus to the portable terminal.

In accordance with an aspect of the present invention, a non-transitory computer-readable recording medium is encoded with a program for controlling a portable terminal included in an image processing system configured to include the portable terminal having a shooting unit and a display unit, one or more image processing apparatuses executing one or more kinds of processes, and an information processing apparatus. The program causes a computer of the portable terminal to obtain positional information and orientation information of the portable terminal and to transmit positional information and orientation information at a time of shooting by the shooting unit, to the information processing apparatus. Each image processing apparatus generates information specifying a process executable at a present time in reflection to a status of the image processing apparatus and transmits the generated information to the information processing apparatus. The information processing apparatus stores, for each of one or more image processing apparatuses, positional information and functional information for specifying a process to be executed by the image processing apparatus, in a storage unit, updates a stored content in the storage unit such that the functional information is associated only with the executable process received from the image processing apparatus, and, upon receiving the positional information and orientation information at a time of shooting from the portable terminal, transmits, to the portable terminal, functional information for specifying a process to be executed by a specific image processing apparatus associated with the received positional information and orientation information. The program further causes the computer to display, on the display unit, a shot image at a time of shooting by the shooting unit and a menu image including an operation unit for designating a process specified by the functional information.

In accordance with another aspect of the present invention, an image processing system includes a portable terminal, one or more image processing apparatuses executing one or more kinds of processes, and an information processing apparatus. The portable terminal includes a shooting unit, an obtaining unit for obtaining positional information and orientation information of the portable terminal, a display unit, and a first transmission unit for transmitting positional information and orientation information at a time of shooting by the shooting unit to the information processing apparatus. The information processing apparatus includes a first storage unit for storing, for each of one or more image processing apparatuses, positional information and connection information which is information for connecting to the image processing apparatus, a search unit for searching for a specific image processing apparatus which is an image processing apparatus included in a shot image by the shooting unit of the portable terminal, from one or more image processing apparatuses stored in the first storage unit, based on the positional information and orientation information at a time of shooting that is received from the portable terminal, and a second transmission unit for transmitting the connection information of the specific image processing apparatus to the portable terminal, Upon receiving the connection information of the specific image processing apparatus, the first transmission unit transmits, to the specific image processing apparatus, information requesting transmission of functional information for specifying a process to be executed by the image processing apparatus, using the connection information. The specific image processing apparatus includes a second storage unit for storing the functional information, an execution unit for executing one or more kinds of processes, a determination unit for determining whether the execution unit can execute each of the one or more kinds of processes at a present time, an update unit for updating the second storage unit such that the functional information stored in the second storage unit is associated only with a process determined to be executable by the determination unit, and a third transmission unit for, upon receiving the information requesting transmission of functional information, transmitting the functional information stored in the second storage unit to the portable terminal. The portable terminal further includes a display control unit for allowing the display unit to display a shot image at a time of shooting by the shooting unit and a menu image including an operation unit for designating a process specified by the functional information, upon receiving the functional information.

In accordance with another aspect of the present invention, an image processing apparatus is included in an image processing system configured to include a portable terminal, one or more image processing apparatuses executing one or more kinds of processes, and an information processing apparatus. The image processing apparatus includes: a storage unit for storing functional information specifying a process to be executed by the image processing apparatus itself; an execution unit for executing one or more kinds of processes; a determination unit for determining whether the execution unit can execute each of the one or more kinds of processes at a present time; an update unit for updating the storage unit such that the functional information stored in the storage unit is associated only with a process determined to be executable by the determination unit; and a transmission unit for, upon receiving, from the portable terminal, information requesting transmission of functional information for specifying a process to be executed by the image processing apparatus, transmitting the functional information stored in the storage unit to the portable terminal.

In accordance with another aspect of the present invention, an information processing apparatus is included in an image processing system configured to include a portable terminal having a shooting unit, one or more image processing apparatuses executing one or more kinds of processes, and the information processing apparatus. The information processing apparatus includes: a storage unit for storing, for each of one or more image processing apparatuses, positional information and connection information which is information for connecting to the image processing apparatus; a reception unit for receiving positional information and orientation information at a time of shooting by the shooting unit from the portable terminal; a search unit for searching for a specific image processing apparatus which is an image processing apparatus included in a shot image by the shooting unit of the portable terminal, from the positional information of one or more image processing apparatuses that is stored in the storage unit, based on the positional information and orientation information at a time of shooting that is received from the portable terminal; and a transmission unit for transmitting the connection information of the specific image processing apparatus to the portable terminal.

In accordance with another aspect of the present invention, provided is a method of controlling an image processing apparatus included in an image processing system configured to include a portable terminal, one or more image processing apparatuses, and an information processing apparatus. The image processing apparatus includes a storage unit and an execution unit executing one or more kinds of processes. The method includes the steps of: the image processing apparatus storing functional information specifying a process to be executed by the image processing apparatus itself, in the storage unit, determining whether the execution unit can execute each of the one or more kinds of processes at a present time, updating the storage unit such that the functional information stored in the storage unit is associated only with a process determined to be executable in the step of determining, and upon receiving, from the portable terminal, information requesting transmission of functional information for specifying a process to be executed by the image processing apparatus, transmitting the functional information stored in the storage unit to the portable terminal.

In accordance with another aspect of the present invention, provided is a method of controlling an information processing apparatus included in an image processing system configured to include a portable terminal having a shooting unit, one or more image processing apparatuses executing one or more kinds of processes, and the information processing apparatus. The method includes the steps of: the information processing apparatus storing, for each of one or more image processing apparatuses, positional information and connection information which is information for connecting to the image processing apparatus, receiving positional information and orientation information at a time of shooting by the shooting unit from the portable terminal, searching for a specific image processing apparatus which is an image processing apparatus included in a shot image by the shooting unit of the portable terminal, from the positional information of one or more image processing apparatuses, based on the positional information and orientation information at a time of shooting that is received from the portable terminal, and transmitting the connection information of the specific image processing apparatus to the portable terminal.

In accordance with another aspect of the present invention, a non-transitory computer-readable recording medium is encoded with a program for controlling a portable terminal in an image processing system configured to include the portable terminal having a shooting unit and a display unit, one or more image processing apparatuses executing one or more kinds of processes, and an information processing apparatus. The program causes a computer of the portable terminal to obtain positional information and orientation information of the portable terminal and to transmit, to the information processing apparatus, positional information and orientation information at a time of shooting by the shooting unit. Upon receiving the positional information and orientation information at a time of shooting from the portable terminal, the information processing apparatus transmits, to the portable terminal, connection information which is information for connecting to a specific image processing apparatus associated with the positional information and orientation information. Upon receiving the connection information of the specific image processing apparatus, the program causes the computer to transmit, to the specific image processing apparatus, information requesting transmission of functional information for specifying a process to be executed by the specific image processing apparatus. The specific image processing apparatus stores the functional information of the apparatus itself, determines whether it can execute each of the one or more kinds of processes at a present time, updates a stored content of the functional information of the apparatus itself so as to be associated only with a process determined to be executable by the apparatus itself, and, upon receiving information requesting transmission of the functional information, transmits the stored functional information to the portable terminal. Upon receiving the functional information, the program further causes the computer to display, on the display unit, a shot image at a time of shooting by the shooting unit and a menu image including an operation unit for designating a process specified by the functional information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing a specific example of an MFP list stored in the server.

FIG. 18 is a diagram showing exemplary information transmitted from the portable terminal to the server.

FIG. 19 is a diagram showing exemplary information indicating the performance of the MFP which is stored in an HD.

FIG. 20 is a diagram showing a specific example of information transmitted from the server to the portable terminal in transmission of the MFP information in a second modification.

FIG. 32 is a diagram illustrating the contents of a job management list stored in the MFP in the sixth modification.

DESCRIPTION OF THE PREFERRED EMBODIMENTS

Figure 1:
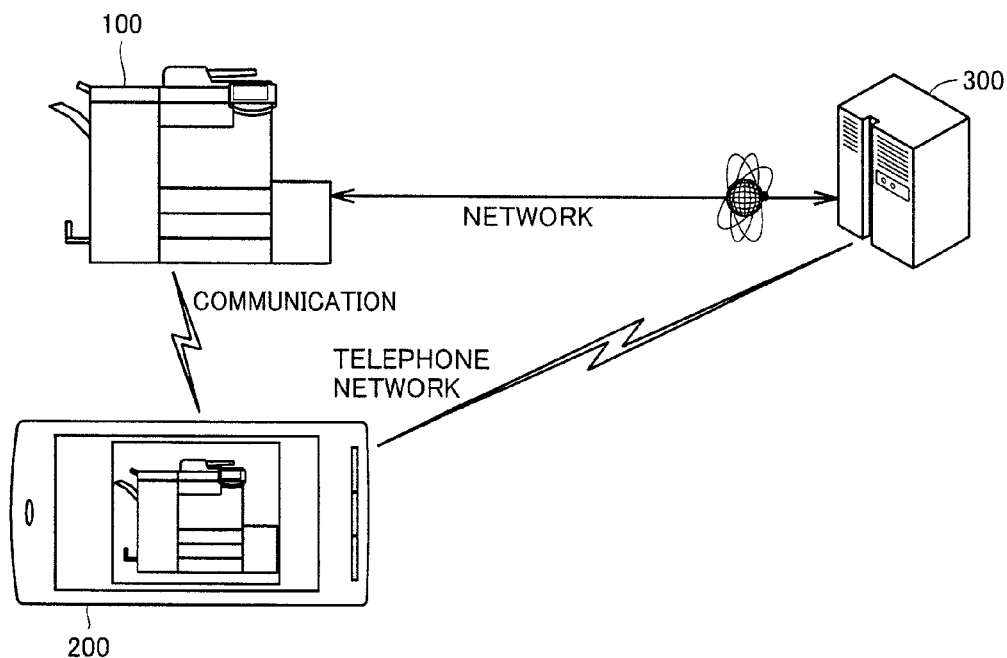
FIG. 1 is a diagram showing a specific example of a configuration of an image processing system according to an embodiment.

In the following, an embodiment of the present invention will be described with reference to the figures. In the following description, the same parts and components are denoted with the same reference numerals. Their names and functions are also the same.

<System Configuration>

FIG. 1 is a diagram showing a specific example of a configuration of an image processing system according to an embodiment.

Referring to FIG. 1, the image processing system according to the present embodiment includes an MFP 100 serving as an image processing apparatus, a portable terminal 200, and a server 300.

The image processing apparatus is not limited to an MFP and may be a printer, a facsimile machine, a copier, or any other similar device having at least one or more image processing functions. MFP 100 is an image processing apparatus that combines these functions.

Portable terminal 200 is, for example, a mobile phone or any other device at least having a camera function, an instruction input function, and a communication function.

The server is a general personal computer or any other similar device.

MFP 100 and potable terminal 200 can communicate with each other and exchange information with each other. Any communication system may be employed in the communication between MFP 100 and portable terminal 200 as long as it is wireless communication. In the examples below, wireless communication using Bluetooth® is employed. However, any other communication such as infrared communication or short-distance wireless communication may be employed.

MFP 100 and server 300 can also communicate with each other and exchange information with each other. The communication between MFP 100 and server 300 is either wired or wireless, and any communication system may be employed. Since it is assumed that the image processing system according to the present embodiment is used in an office environment, MFP 100 and server 300 are connected to a wired or wireless LAN (Local Area Network) and exchange information through the network, by way of example.

Portable terminal 200 and server 300 can also communicate with each other and exchange information with each other. Any communication system may be employed in the communication between portable terminal 200 and server 300 as long as it is wireless communication. In the examples below, wireless communication using a telephone network is employed. However, infrared communication or short-distance wireless communication may be employed. In the case where portable terminal 200 and server 300 are connected to a wireless LAN, information may be exchanged over the network.

In the following description, different communication systems are employed, specifically, wireless communication using Bluetooth® between MFP 100 and portable terminal 200, communication via a LAN between MFP 100 and server 300, and wireless communication using a telephone network between portable terminal 200 and server 300. However, the same communication system such as communication via a LAN may be employed in each communication.

Although the image processing system in FIG. 1 is configured to include one MFP, one portable terminal, and one server, it may at least include more than one MFP and more than one potable terminal.

<Overall Operations>

The overall operations in the image processing system according to the present embodiment mainly include an MFP information registration operation and an operation for operating the MFP.

Here, "MFP information" refers to information about the MFP included in the image processing system, which is registered in server 300, and includes positional information which is information for specifying the position of MFP 100, communication information which is information for communication, and functional information which is information for specifying the installed available function. Specific examples thereof will be described later. Plural pieces of MFP information stored in server 300 may also referred to as an "MFP list" in the following description.

The MFP information registration operation is performed prior to the operation for operating the MFP and refers to an operation of registering information of MFP 100 in server 300 at a prescribed timing or updating the information of MFP 100 stored in server 300 with the latest information.

Figure 2:
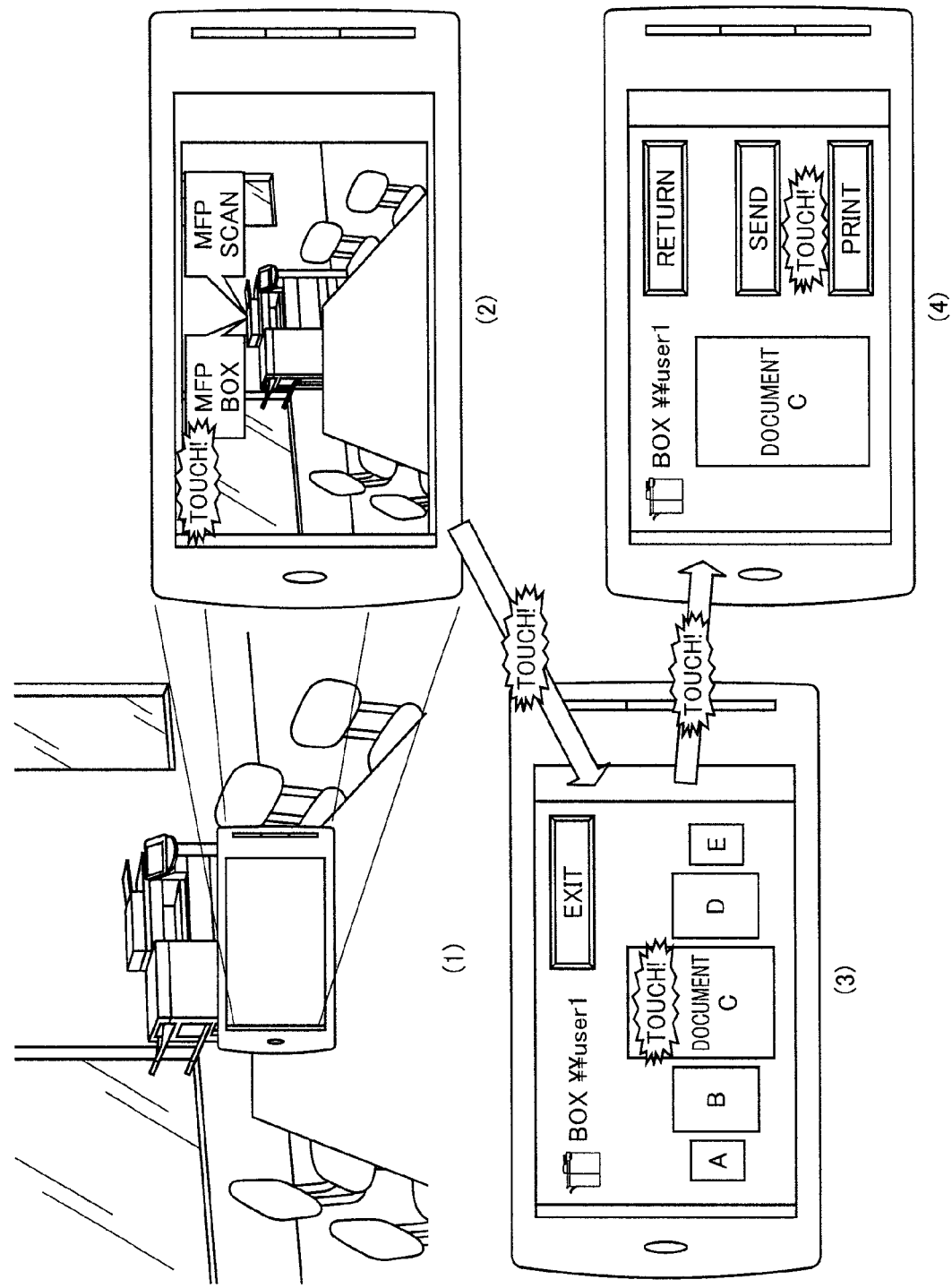
FIG. 2 is a diagram for illustrating overall operations in the image processing system according to the embodiment.

The operation for operating the MFP refers to an operation of performing an operation using portable terminal 200 to allow MFP 100 to execute image processing using a function installed in MFP 100. FIG. 2 is a diagram for illustrating the overall operations in the image processing system according to the embodiment. The operation for operating MFP 100 in the image processing system will be described using FIG. 2.

Referring to FIG. 2, a user carrying portable terminal 200 points portable terminal 200 at MFP 100 serving as an operation target to shoot MFP 100 (FIG. 2 (1)). Then, the shot image of MFP 100 serving as an operation target appears on a display screen of portable terminal 200. The functions available in MFP 100 are selectably displayed in the form of tags superimposed on the shot image (FIG. 2 (2)). The user selects a tag representing a function to use, from those tags.

It is noted that the "tag" here refers to an option displayed on the touch panel, and is labeled with a function to be operated, as illustrated in FIG. 2 (2), and displayed in the vicinity of the image of MFP 100 as an operation target so as to be superimposed on the original image. Touching the tag designates to perform the operation corresponding to the function.

For example, when the user selects (touches) a tag indicating a box function which is a function of processing image data stored in a storage area associated with the user ("touch" in FIG. 2 (2)), the screen display of portable terminal 200 switches to a screen for operating the box function of MFP 100 (FIG. 2 (3)). When image data to be processed is selected on the screen ("touch" in FIG. 2 (3)), the screen display of portable terminal 200 further switches to a screen for selecting a method of processing the image data (FIG. 2 (4)). Then, when a processing method is selected on the screen ("touch" in FIG. 2 (4)), image processing based on the operation is executed in MFP 100.

The configuration of each device for performing these operations will be described below.

<Configuration of MFP>

Figure 3:
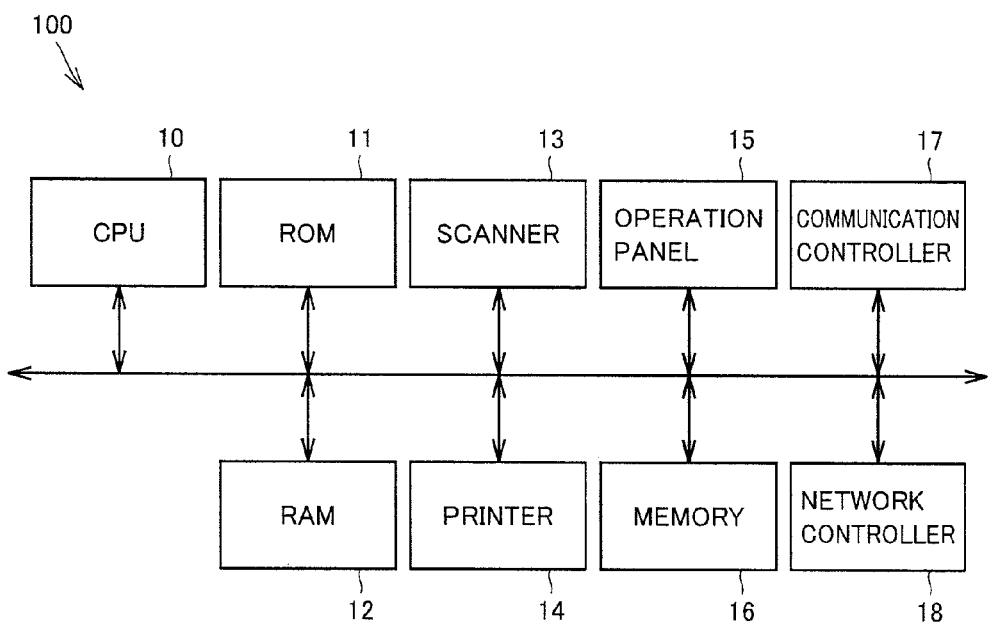
FIG. 3 is a diagram showing a specific example of a hardware configuration of an MFP (Multi-Functional Peripheral) included in the image processing system according to the embodiment.

FIG. 3 shows a specific example of a hardware configuration of MFP 100.

Referring to FIG. 3, MFP 100 includes a CPU (Central Processing Unit) 10 as an arithmetic unit for controlling MFP 100 as a whole, a ROM (Read Only Memory) 11 for storing a program executed in CPU 10, a RAM (Random Access Memory) 12 functioning as a work area for executing a program in CPU 10, a scanner 13 for optically scanning a document placed on a not-shown platen to obtain image data, a printer 14 for fixing image data on print paper, an operation panel 15 including a touch panel for displaying information and accepting an operation input to MFP 100, a memory 16 for storing image data, a communication controller 17 for controlling wireless communication using Bluetooth®, and a network controller 18 for controlling communication via a LAN.

Figure 4:
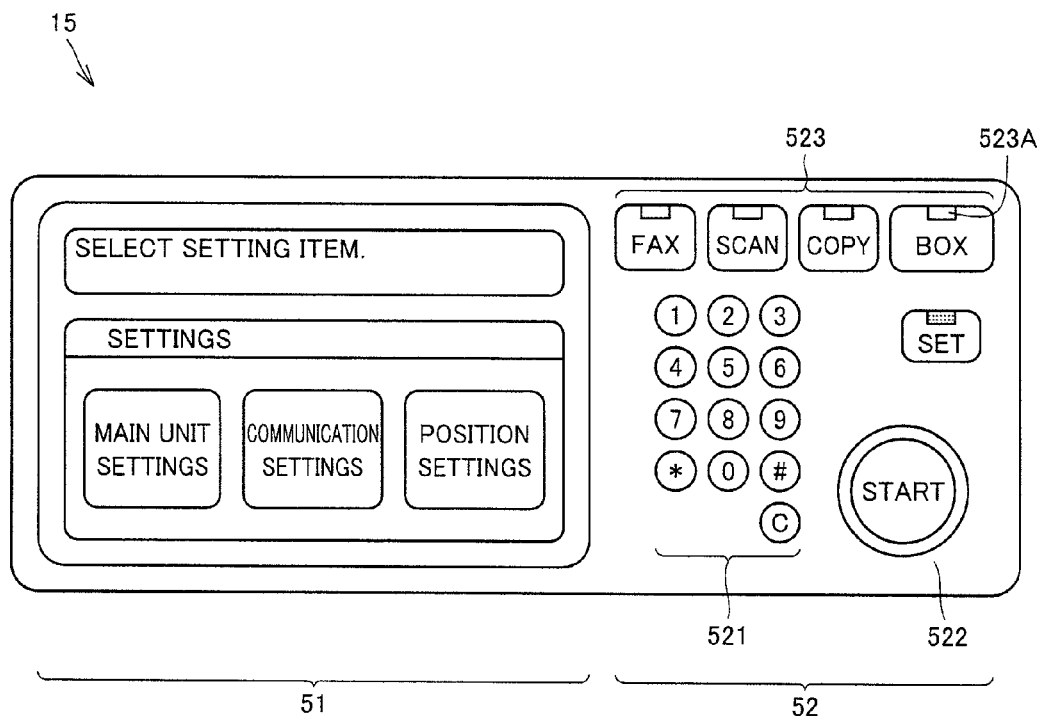
FIG. 4 is a diagram showing a specific example of a configuration of an operation panel of the MFP.

FIG. 4 is a diagram showing a specific example of a configuration of operation panel 15.

Referring to FIG. 4, operation panel 15 includes a touch panel 51 and operation keys 52. Touch panel 51, configured to include a display such as a liquid crystal display and a position designating device such as an optical touch panel or a capacitive touch panel, displays an operation screen and specifies a designated position on the operation screen. CPU 10 allows touch panel 51 to display an operation screen, based on data for allowing image display that is stored beforehand.

Operation keys 52 include a ten-key pad 521, a start key 522 for designating start of a job, and mode select keys 523 for selecting a mode to be activated. Mode select keys 523 each include an indicator lamp 523A containing, for example, an LED (Light Emitting Diode) to indicate being selected.

An operation signal indicating a designated position (touched position) specified on touch panel 51 or a pressed key is input to CPU 10. CPU 10 then specifies an operation content based on the pressed key, or the displayed operation screen and the designated position, and executes a process based on the operation content.

<Configuration of Portable Terminal>

Figure 5:
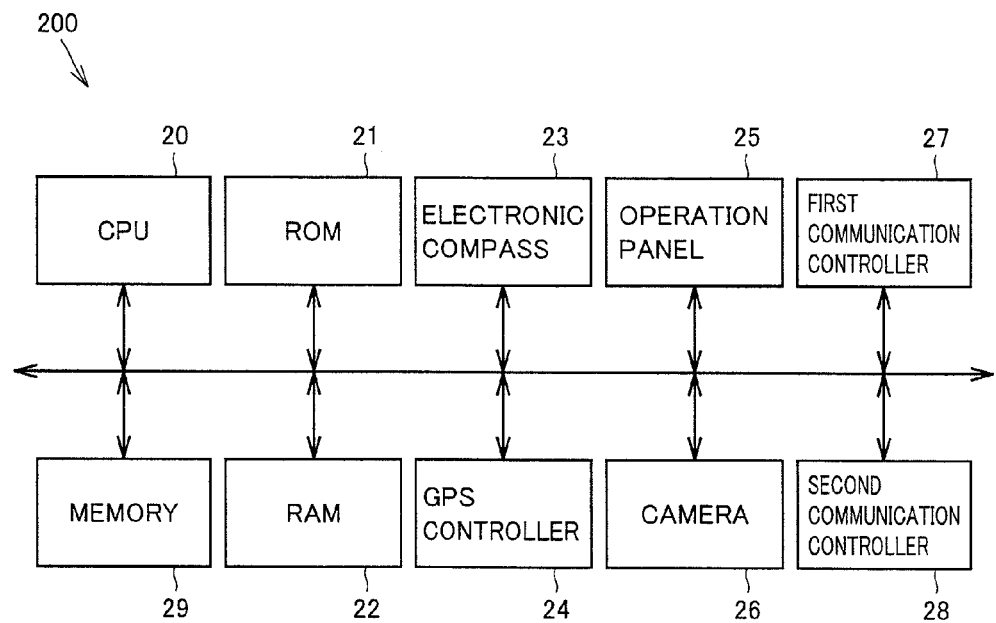
FIG. 5 is a diagram showing a specific example of a hardware configuration of a portable terminal included in the image processing system according to the embodiment.

FIG. 5 is a diagram showing a specific example of a hardware configuration of portable terminal 200.

Referring to FIG. 5, portable terminal 200 includes a CPU 20 as an arithmetic unit for controlling portable terminal 200 as a whole, a ROM 21 for storing a program executed in CPU 20, a RAM 22 functioning as a work area for executing a program in CPU 20, an electronic compass 23 including a magnetic sensor for detecting an orientation of potable terminal 200, a GPS (Global Positioning System) controller 24 receiving a GPS signal or a positional signal from a base station for obtaining positional information of portable terminal 200, an operation panel 25 including a touch panel for displaying information and accepting an operation input to portable terminal 200, a camera 26, a first communication controller 27 for controlling communication via a telephone network through communication with a not-shown base station, a second communication controller 28 for controlling wireless communication using Bluetooth®, and a memory 29 for storing telephone book data and the like.

Operation panel 25 may be configured similar to operation panel 15 of MFP 100. More specifically, it includes, for example, a touch panel formed of a display such as a liquid crystal display and a position designating device such as an optical touch panel or a capacitive touch panel, and operation keys.

CPU 20 allows the touch panel to display an operation screen based on data for allowing screen display that is stored beforehand. A designated position on the operation screen is specified on the touch panel, and an operation signal indicating the designated-position is input to CPU 20. An operation signal indicating the pressed key is also input to CPU 20. CPU 20 specifies an operation content based on the pressed key, or the displayed operation screen and the designated position, and executes a process based on the operation content.

Electronic compass 23 and GPS controller 24 output a signal to CPU 20 to indicate the obtained orientation or positional information of potable terminal 200.

<Configuration of Server>

Figure 6:
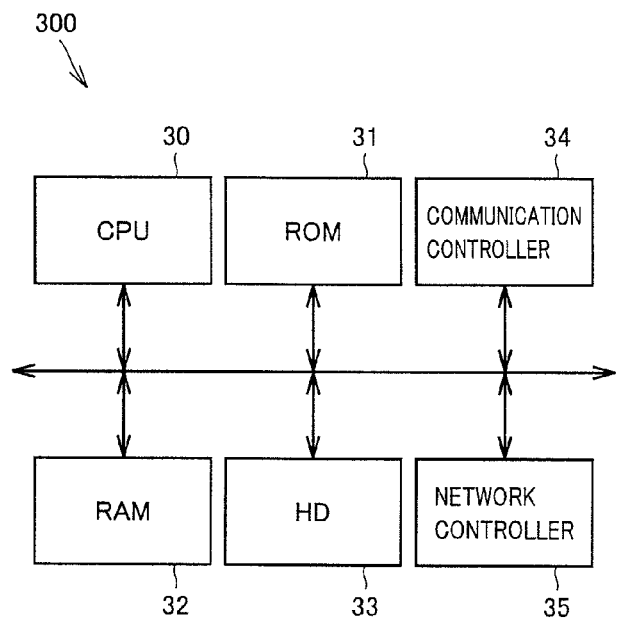
FIG. 6 is a diagram showing a specific example of a hardware configuration of a server included in the image processing system according to the embodiment.

FIG. 6 is a diagram showing a specific example of a hardware configuration of server 300.

Referring to FIG. 6, server 300 is formed, for example, of a general computer as described above. By way of example, server 300 includes a CPU 30 as an arithmetic unit for controlling server 300 as a whole, a ROM 31 for storing a program executed in CPU 30, a RAM 32 functioning as a work area for executing a program in CPU 30, an HD (Hard Disk) 33 for storing MFP information and the like, a communication controller 34 for controlling communication via a telephone network, and a network controller 35 for controlling communication via a LAN.

<Functional Configuration>

The functional configuration of each device for implementing the operation as illustrated in the overall operations in the image processing system will be described.

Figure 7:
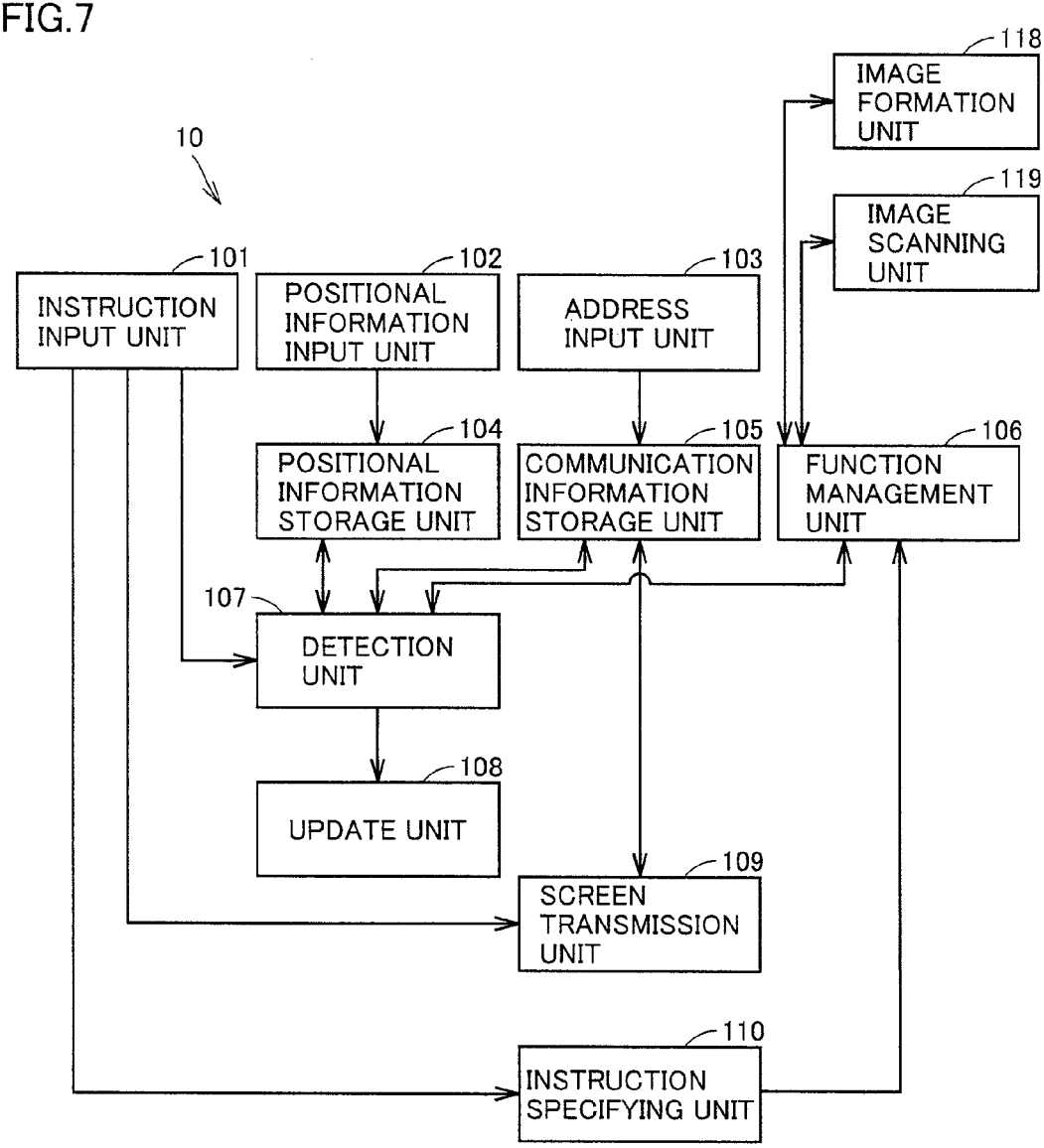
FIG. 7 is a block diagram showing a specific example of a functional configuration of the MFP.

FIG. 7 is a block diagram showing a specific example of a functional configuration of MFP 100. Each function shown in FIG. 7 is a function mainly formed in CPU 10 when CPU 10 reads out a program stored in ROM 11 and executes the program on RAM 12. However, at least part of the functions may be formed by the hardware configuration shown in FIG. 3.

Referring to FIG. 7, as functions for implementing the operations as described above, MFP 100 includes an instruction input unit 101 for accepting an instruction input from operation panel 15 or any other device, a positional information input unit 102 for accepting input of its own positional information from operation panel 15 or from the GPS function not shown in FIG. 3, if any, an address input unit 103 for accepting input of a LAN address and an address in wireless communication using Bluetooth®, a positional information storage unit 104 for storing the positional information accepted by positional information input unit 102, a communication information storage unit 105 for storing the address accepted by address input unit 103, as communication information, a function management unit 106 for managing the functions of MFP 100 and allowing each function to execute an operation, a detection unit 107 for detecting a change of positional information, communication information, and executable functions in MFP 100, an update unit 108 for transmitting the positional information, communication information, and functional information of MFP 100 as MFP information to server 300 to register or update the MFP information in the MFP list in server 300, a screen transmission unit 109 for transmitting required operation screen data among operation screens data stored beforehand, in response to a request from portable terminal 200 as described later, and an instruction specifying unit 110 for specifying the content of an instruction from portable terminal 200.

The method of specifying an instruction content in instruction specifying unit 110 is similar to the method of specifying the instruction content in the case where a touch instruction is accepted in accordance with an operation screen on its own operation panel 15. More specifically, instruction specifying unit 110 specifies where in the operation screen the designated position is located, based on a signal for specifying the designated position from portable terminal 200 and the transmitted screen data, and determines the instruction content corresponding to the specified position with reference to the correspondence stored beforehand between the position on the screen and the instruction content.

Figure 8:
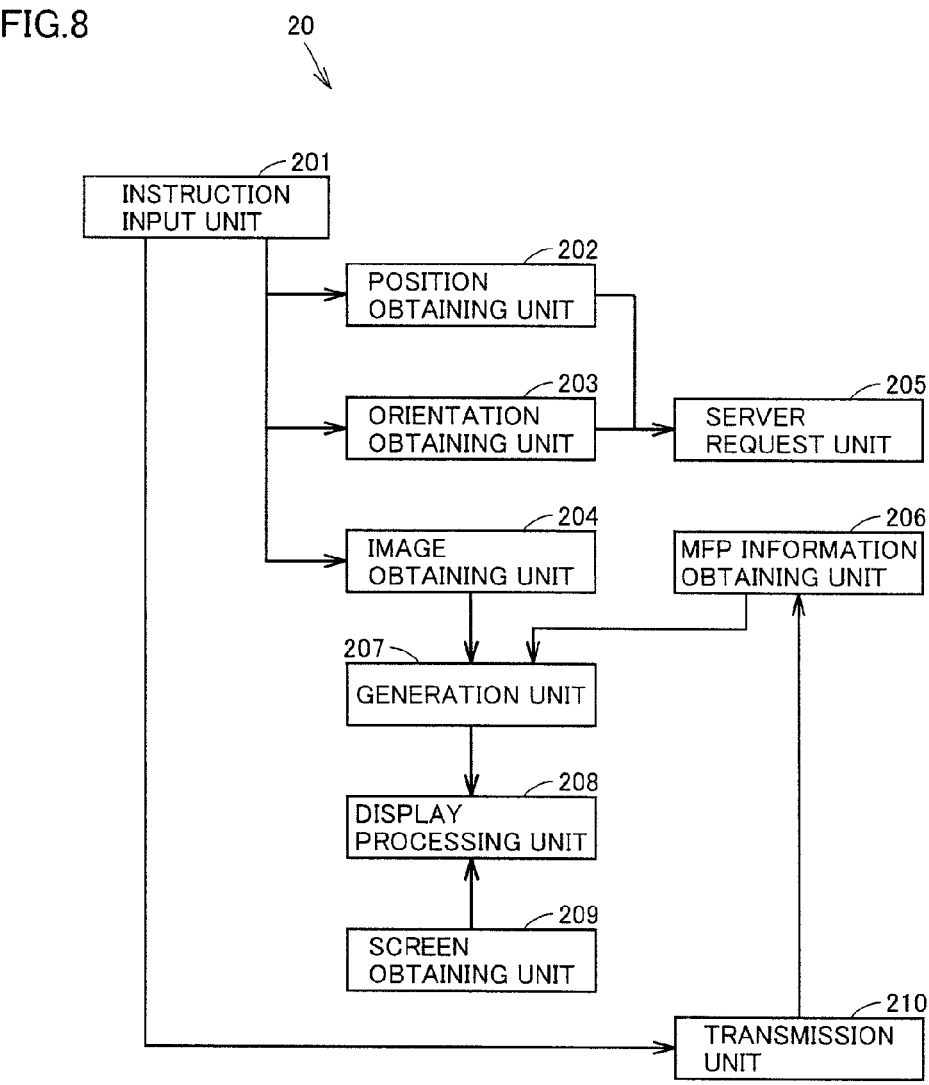
FIG. 8 is a block diagram showing a specific example of a functional configuration of the portable terminal.

FIG. 8 is a block diagram showing a specific example of a functional configuration of portable terminal 200. Each function shown in FIG. 8 is a function mainly formed in CPU 20 when CPU 20 reads out a program stored in ROM 21 and executes the program on RAM 22. However, at least part of the functions may be formed by the hardware configuration shown in FIG. 5.

Referring to FIG. 8, as functions for implementing the operations as described above, portable terminal 200 includes an instruction input unit 201, a position obtaining unit 202, an orientation obtaining unit 203, an image obtaining unit 204, a server request unit 205, an MFP information obtaining unit 206, a generation unit 207, a display processing unit 208, a transmission unit 210, and a screen obtaining unit 209.

Instruction input unit 201 accepts an instruction input from operation panel 25.

Position obtaining unit 202 obtains positional information of portable terminal 200 in response to a shooting instruction from operation panel 25.

Orientation obtaining unit 203 obtains an orientation of portable terminal 200 in response to a shooting instruction from operation panel 25.

Image obtaining unit 204 obtains image data captured by shooting by camera 26 in response to a shooting instruction from operation panel 25.

Server request unit 205 requests the MFP information from server 300 based on the positional information and orientation information obtained in response to a shooting instruction from operation panel 25.

MFP information obtaining unit 206 obtains the MFP information of MFP 100 serving as an operation target from server 300 in response to the request.

Generation unit 207 generates new screen data by combining selectable tags with image data based on the image data obtained by shooting and the MFP information.

Display processing unit 208 executes a process for displaying the new screen data on operation panel 25.

Transmission unit 210 for transmitting, to MFP 100, an operation signal specifying a designated position on the display screen based on the new screen data.

Screen obtaining unit 209 obtains screen data transmitted from MFP 100 in response to the operation signal.

Since position obtaining unit 202 and orientation obtaining unit 203 obtain positional information and orientation information, respectively, in response to a shooting instruction from operation panel 25, the information thereof can serve as information of a shooting position and information of a shooting direction, respectively. Then, in the description below, the positional information and orientation information transmitted from portable terminal 200 to server 300 in accordance with the program are also referred to as shooting position information and shooting direction information, respectively.

Figure 9:
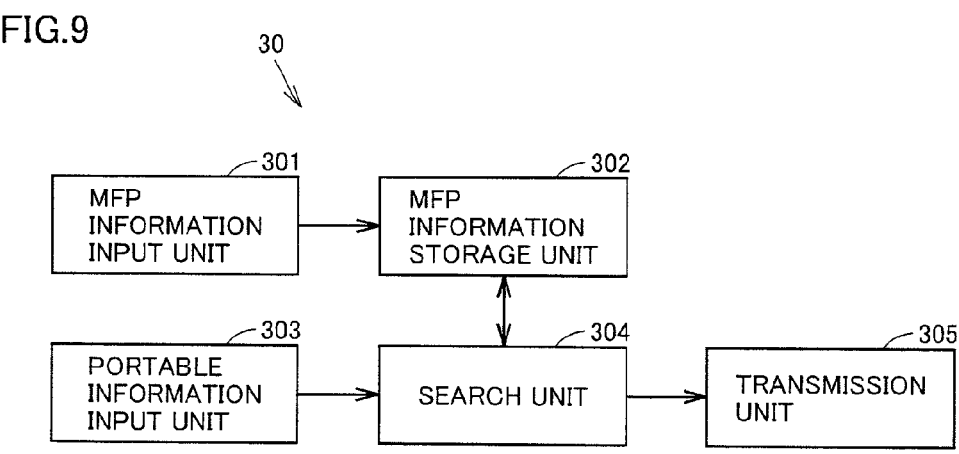
FIG. 9 is a block diagram showing a specific example of a functional configuration of the server.

FIG. 9 is a block diagram showing a specific example of a functional configuration of server 300. Each function shown in FIG. 9 is a function mainly formed in CPU 30 when CPU 30 reads out a program stored in ROM 31 and executes the program on RAM 32. However, at least part of the functions may be implemented by the hardware configuration shown in FIG. 6.

Referring to FIG. 9, as functions for implementing the operations as described above, server 300 includes an MFP information input unit 301 for accepting input of MFP information from MFP 100, an MFP information storage unit 302 for storing or updating the MFP information input in the MFP list in a prescribed area of HD 33, a portable information input unit 303 for accepting input of a shooting position and a shooting direction together with a request for MFP information from portable terminal 200, a search unit 304 for searching for the MFP present in the shot image of portable terminal 200 based on the shooting position and the shooting direction of portable terminal 200, by referring to each positional information in the MFP list, and a transmission unit 305 for transmitting the MFP information of the found MFP 100 to portable terminal 200.

<Operation Flow for Registration of MFP Information>

Figure 10:
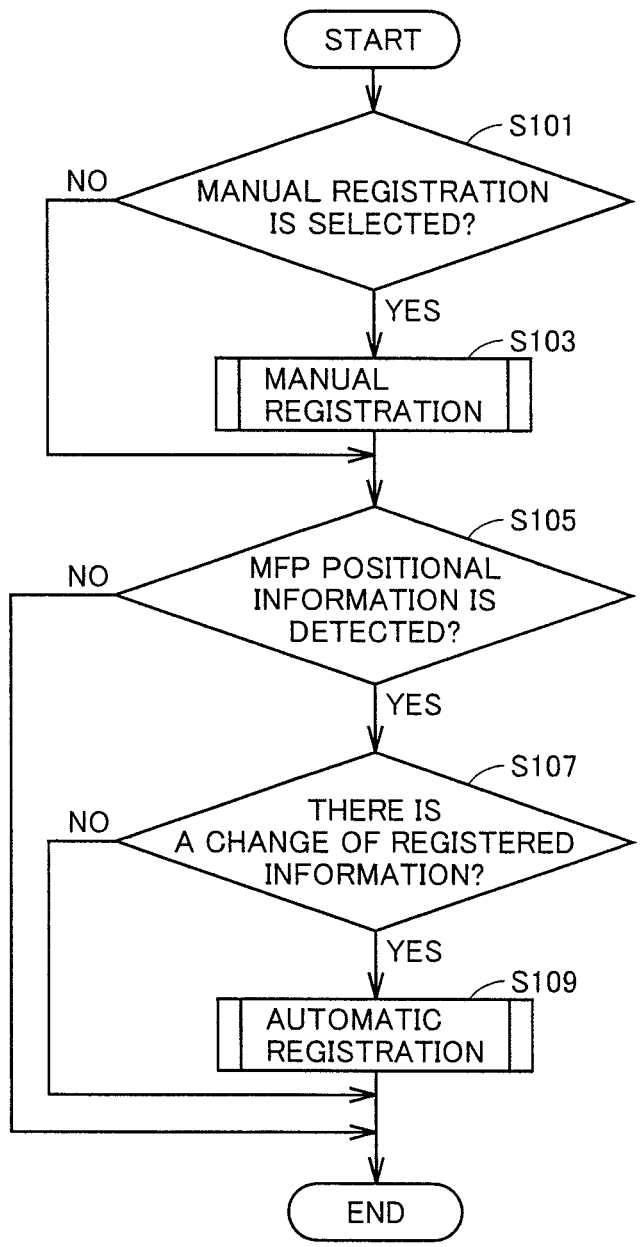
FIG. 10 is a flowchart showing a specific example of an operation in the MFP performing an MFP information registration operation.

FIG. 10 is a flowchart showing a specific example of an operation in MFP 100 performing the MFP information registration operation. The operation shown in the flowchart in FIG. 10 is implemented when CPU 10 reads out a program stored in ROM 11 and executes the program on RAM 12.

Here, the registration of MFP information includes "manual registration" performed by user's operation and "automatic registration" automatically performed without user's operation at a predetermined prescribed timing. Which registration method is employed is preset in MFP 100, for example, by an administrator. CPU 10 stores the setting.

Referring to FIG. 10, when the "manual registration" is set (YES in step S101), in step S103, CPU 10 executes a predetermined MFP information registration operation in accordance with an operation signal from operation panel 15. Specifically, CPU 10 accepts input of positional information, communication information, and functional information as MFP information in accordance with an operation signal from operation panel 15 and stores the information. Then, the information is transmitted as MFP information to server 300.

On the other hand, when the "automatic registration" is set (NO in step S101), CPU 10 detects positional information, communication information, functional information at the respective prescribed timings. The prescribed timings are, for example, the timing at which MFP 100 is installed, the timing at which network communication is established, or prescribed time intervals. At the instant when the positional information, communication information, or functional information is detected (YES in step S105), CPU 10 compares the detected information with the stored information and determines whether there is a change. If a change is detected (YES in step S107), in step S109, CPU 10 executes a predetermined MFP information registration operation. Specifically, CPU 10 updates the information detected being changed, of the stored positional information, communication information, and functional information, with the latest information and thereafter transmits the MFP information to server 300. Here, only the information that has changed in the MFP information may be transmitted, or the entire MFP information may be transmitted.

Upon receiving the MFP information from MFP 100, server 300 updates the MFP list stored in a prescribed area in HD 33. Specifically, when the MFP information of MFP 100 is not registered in the MFP list, server 300 newly registers the received MFP information. When it has already been registered, server 300 updates the registered MFP information with the received MFP information.

Through this registration operation, the position, address, and installed available functions of each MFP included in the image processing system are registered in server 300.

FIG. 11 is a diagram showing a specific example of the MFP list stored in server 300. Referring to FIG. 11, registered in the MFP list, for each MFP included in the image processing system, are the latitude, longitude, and altitude as positional information, the IP address that is an address for communicating with server 300 and the Bluetooth® address that is an address for communicating with portable terminal 200 as communication information, and presence/absence of the box function and the scan function each as functional information.

The MFP information is not limited to the one shown in FIG. 11. For example, an altitude may not be included in the positional information. In a case where any other communication system is employed, the communication information may be an address according to the communication system. The functional information may include the presence/absence of any other function. In a case where user authentication is performed as described later, whether to permit the use of a function for each user may be included.

In the foregoing description, the MFP information is transmitted from MFP 100 to server 300 for registration or update of the MFP list. Alternatively, in a case where server 300 has an input device, an administrator of the image processing system, for example, may directly input MFP information to server 300. Alternatively, a not-shown communication terminal connected to MFP 100 may transmit MFP information to server 300. In this case, MFP 100 may not be able to communicate with server 300 as long as the communication terminal connected to MFP 100 can communicate with server 300.

<Operation Flow for Operation for Operating MFP>

Figure 12:
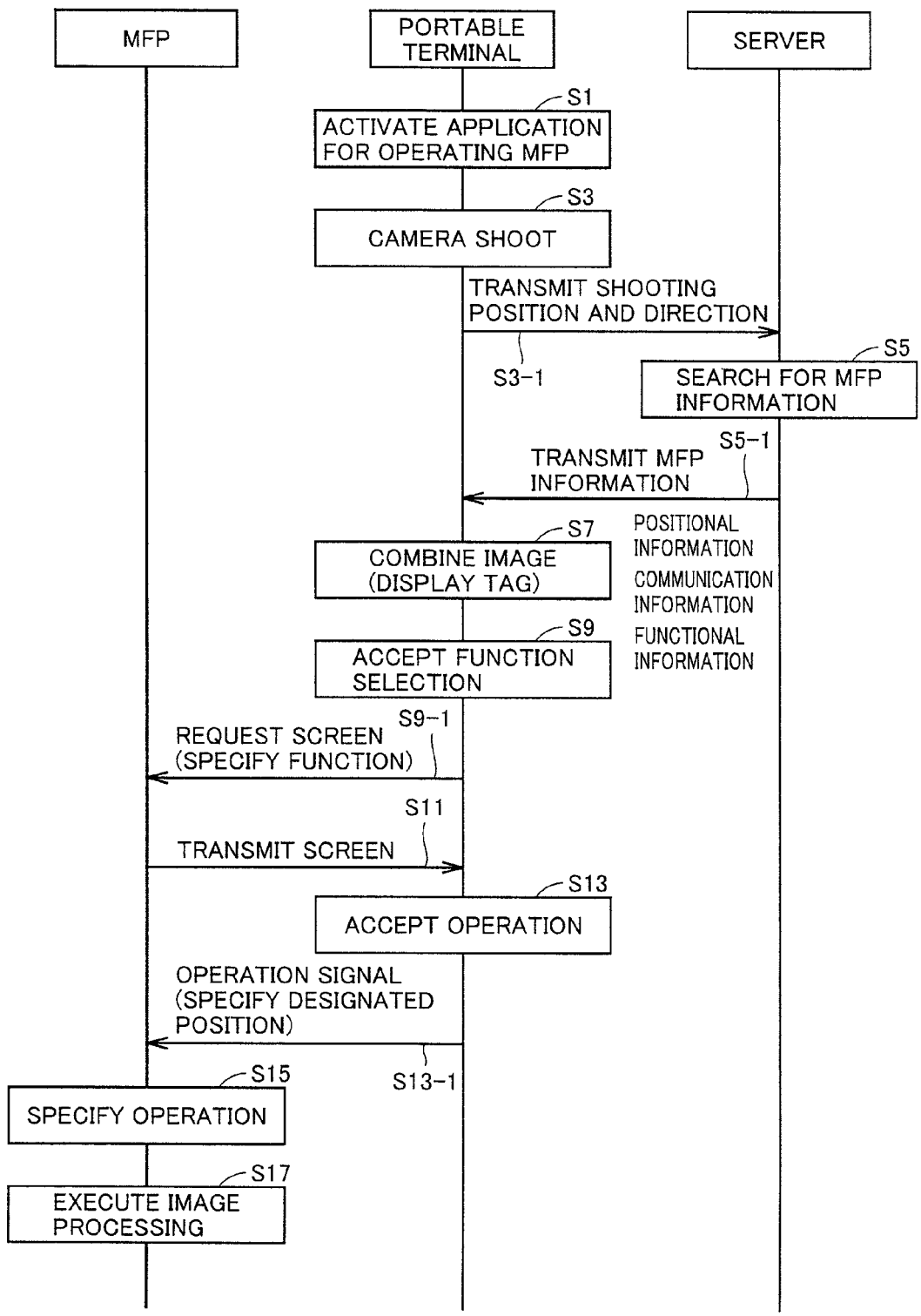
FIG. 12 is a sequence diagram illustrating a flow of an operation for operating the MFP.

FIG. 12 is a sequence diagram illustrating a flow of an operation for operating the MFP. FIG. 12 shows a flow of processing in MFP 100 on the left side, a flow of processing in portable terminal 200 at the middle, and a flow of processing in server 300 on the right side. Each operation is implemented when the CPU of each device reads out a program stored in the ROM and executes the program on the RAM.

Referring to FIG. 12, in a state in which application for MFP operation is being activated in portable terminal 200 (step S1), the camera shoots a photo (step S3), and then the information that specifies a shooting position and a shooting direction at portable terminal 200 is transmitted to server 300, whereby the corresponding MFP information is requested (step S3-1).

Server 300 accepts the request from portable terminal 200 and searches for the MFP information of the MFP located in a prescribed range in the shooting direction from the shooting position from portable terminal 200, with reference to each positional information in the stored MFP list (step S5). Then, the corresponding MFP information is transmitted to portable terminal 200 (step S5-1). At portable terminal 200, the application combines the image data from camera 26 with tags for selecting the functions specified by the functional information included in the received MFP information and displays the combined image on operation panel 25 (step S7).

When the tag is selected (touched) on the image displayed on operation panel 25 of portable terminal 200 (step S9), a request for a screen is given to MFP 100 together with the information that specifies the function corresponding to the selected tag (step S9-1).

MFP 100 transmits screen data for operating a process by the requested function to the requestor portable terminal 200 (step S11). Here, the screen data stored beforehand to be displayed on its own operation panel 15 may be transmitted to portable terminal 200, or the corresponding screen data stored for portable terminal 200 may be transmitted, or if the information specifying portable terminal 200 is transmitted together from the requestor portable terminal 200, the screen data stored beforehand to be displayed on its own operation panel 15 may be transmitted after being subjected to resolution conversion based on the information of portable terminal 200.

Here, the screen data itself is transmitted from MFP 100 to portable terminal 200. However, in a case where the program activated in portable terminal 200 has a function of generating an operation screen, only the information necessary for the operation screen may be transmitted from MFP 100 to portable terminal 200, and screen data may be generated in portable terminal 200 based on the transmitted information.

At portable terminal 200, an operation screen is displayed based on the transmitted screen data. Then, when a touch operation is made on the screen (step S13), information specifying the designated position is transmitted as an operation signal to MFP 100 (step S13-1). The operation signal transmitted here is, for example, an operation signal that specifies the position designated on operation panel 25 by the relative position thereof to the displayed screen. As another example, in a case where the application running on portable terminal 200 has a function of analyzing the screen data from MFP 100, the operation content corresponding to the position designated on operation panel 25 may be specified, and an operation signal indicating the content may be transmitted to MFP 100.

MFP 100 specifies the operation content based on the screen data transmitted to portable terminal 200 and the designated position represented by the received operation signal (step S15). Here, when an additional operation is required to perform the selected function, MFP 100 transmits the screen data for the next operation screen in accordance with the program for executing the selected function of its own. In this case, the operation above in steps S11 to S15 is repeated until the function is executed.

Then, when all the operations necessary to execute the function are specified, MFP 100 executes image processing using the function in accordance with the operations (step S17).

In a case where the program activated in portable terminal 200 has a function of generating a control signal, a control signal for MFP 100 may be generated in accordance with the screen data and the position designated on operation panel 25, and transmitted in place of the operation signal in step S13-1. In this case, MFP 100 executes image processing in accordance with the control signal from portable terminal 200.

Figure 13:
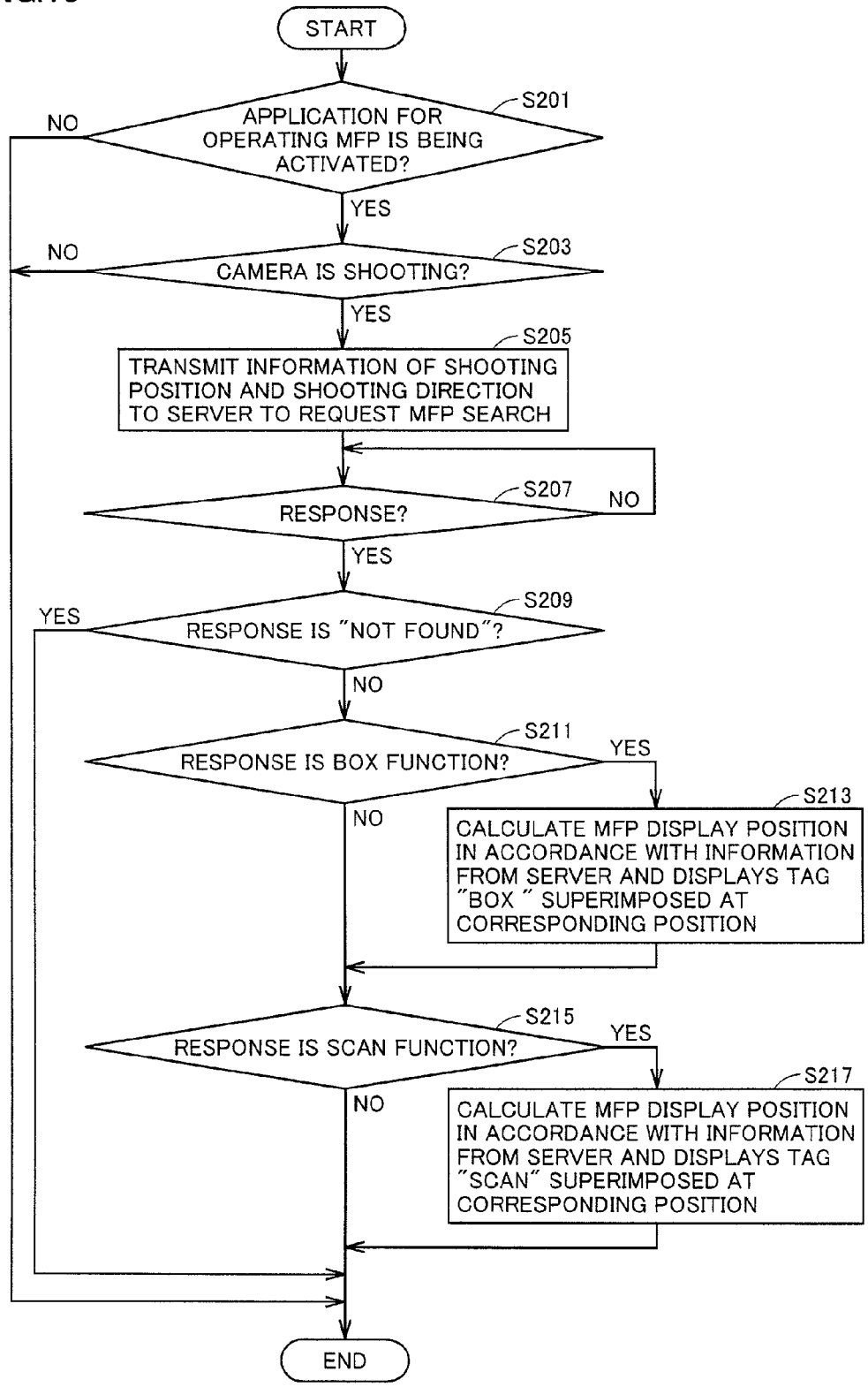
FIG. 13 is a flowchart illustrating an operation in the portable terminal for displaying a tag superimposed on a shot image.
Figure 14:
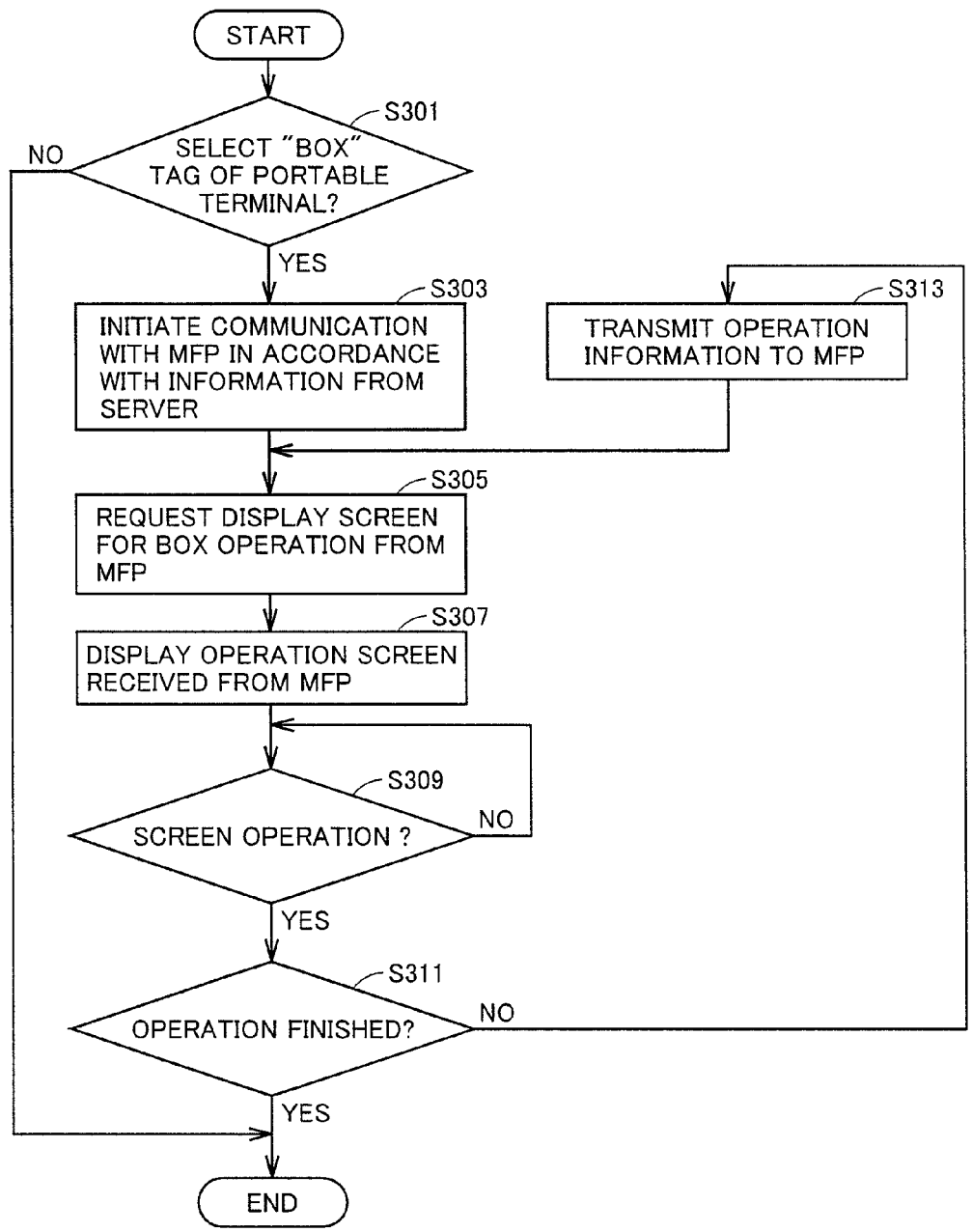
FIG. 14 is a flowchart illustrating an operation in the portable terminal in a case where a box function is selected as a function to be operated.
Figure 15:
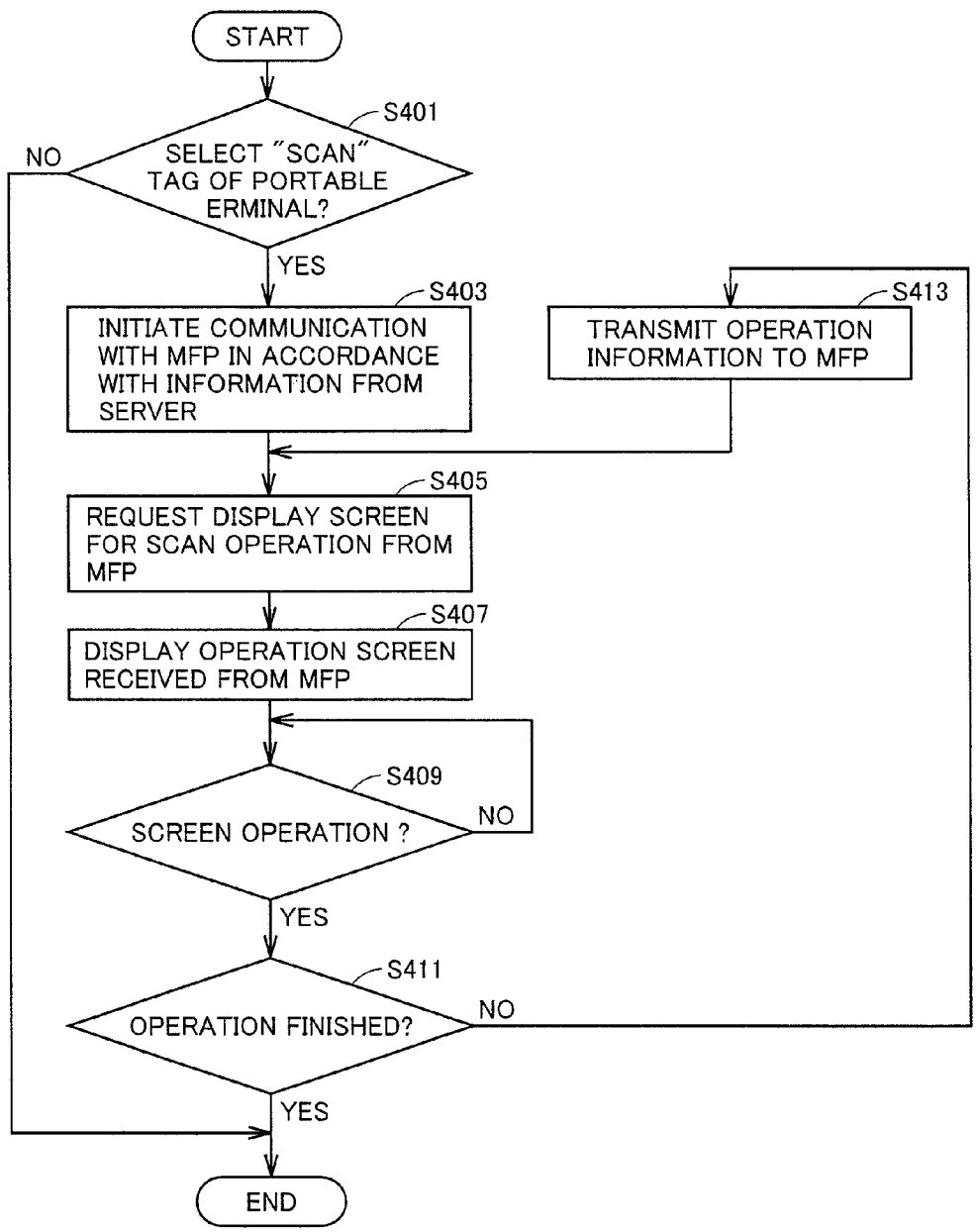
FIG. 15 is a flowchart illustrating an operation in the portable terminal in a case where a scan function is selected as a function to be operated.

The operation in portable terminal 200 will be described in detail below using the flowcharts. FIG. 13, FIG. 14, and FIG. 15 are flowcharts each illustrating an operation in portable terminal 200 performing an operation for operating the MFP. FIG. 13 is a flowchart illustrating an operation for displaying a tag superimposed on a shot image, FIG. 14 is a flowchart illustrating an operation in a case where a box function is selected as a function to be operated, and FIG. 15 is a flowchart illustrating an operation in a case where a scan function is selected as a function to be operated. The operations shown in the flowcharts in FIG. 13, FIG. 14, and FIG. 15 are implemented when CPU 20 reads out a program stored in ROM 21 corresponding to the application for operating the MFP and executes the read program on RAM 22.

Referring to FIG. 13, in a state in which CPU 20 is executing the application for operating the MFP (YES in step S201), and if camera 26 is shooting a photo (YES in step S203), then in step S205, CPU 20 transmits information representing a shooting position and a shooting direction to server 300 and requests transmission of the MFP information of the corresponding MFP.

FIG. 18 is a diagram showing exemplary information transmitted from portable terminal 200 to server 300. FIG. 18 shows a description written in the XML (Extensible Markup Language).

Referring to FIG. 18, in this description, information specifying the shooting position and the shooting direction that is transmitted to request transmission of the MFP information is enclosed in <reqinfo> tags. This tag means that this document is to request transmission of MFP information. In this description, latitude information (34.858893 (which means 34°858' 893" North)) is enclosed in <gps-xpos> tags, and longitude information (135.725031 (which means 135°725'031" East)) is enclosed in <gps/ypos> tags. The latitude and longitude information is enclosed in <gps> tags. Thus, the information enclosed in <gps> tags is shown as an example of information specifying the shooting position. Then, angular information (232.000005) is enclosed in <dir> tags. Thus, the angular information is shown as an example of information specifying the shooting direction.

When a response is received from server 300 (YES in step S207), and when the response is the MFP information (NO in step S209), CPU 20 executes a process for combining tags for selecting the functions specified by the functional information of the MFP information with the image data obtained by shooting, and displaying the combined image.

Specifically, when the functional information shows that the box function is available (YES in step S211), in step S213, CPU 20 calculates the MFP display position in the image data obtained by shooting based on the positional information of the MFP included in the MFP information, and displays a tag for designating start of the operation for the box function so as to be combined at the calculated position or in the vicinity thereof. In the example of the screen in FIG. 2 (2), image data of the tag labeled with "BOX" is stored beforehand, and screen data is generated by combining the image data at the calculated position and is displayed on operation panel 25.

When the functional information shows that the scan function is available (YES in step S215), in step S217, CPU 20 calculates the MFP display position in the image data obtained by shooting based on the positional information of the MFP included in the MFP information, and displays a tag for designating start of the operations for the scan function so as to be combined in the calculated position or in the vicinity thereof. In the example of the screen in FIG. 2 (2), image data of the tag labeled with "scan" is stored beforehand, and screen data is generated by combining the image data at the calculated position and is displayed on operation panel 25.

Next, referring to FIG. 14, when the tag representing the box function is selected from the displayed tags (YES in step S301), in step S303, CPU 20 reads out the Bluetooth® address of MFP 100 from the communication information of the MFP information and initiates communication using Bluetooth® with MFP 100. Then, in step S305, the screen data for operating the process by the box function is transmitted to MFP 100.

Upon receiving the corresponding screen data from MFP 100, in step S307, CPU 20 allows operation panel 25 to display an operation screen based on the screen data. Upon accepting the operation based on the operation screen, that is, the touch operation on the operation screen (YES in step S309 and NO in step S311), in step S313, CPU 20 transmits a signal specifying the designated position on the operation screen as an operation signal to MFP 100.

The operation thereafter returns to step S305 described above, and the following operation is repeated until the end of operation (YES in step S311). More specifically, a signal specifying the designated position on the operation screen is transmitted as an operation signal to MFP 100 every time a touch operation on the operation screen is accepted, and the next screen data is then transmitted from MFP 100. Accordingly, the operation screens for inputting operations in the box function appear one after another, as depicted in FIG. 2 (3) (4), so that the operations necessary for the process by the box function are accepted on operation panel 25 of portable terminal 200. In the present embodiment, menu information for specifying a process to be executed by the image processing apparatus is constructed with the information for displaying an operation screen that is transmitted from MFP 100 to portable terminal 200 (screen data or data necessary to display the screen data).

When the tag representing the scan function is selected from the displayed tags, CPU 20 also performs an operation similar to the operation illustrated in FIG. 14. Specifically, referring to FIG. 15, when the tag representing the scan function is selected from the displayed tags (YES in step S401), in step S403, CPU 20 reads out the Bluetooth® address of MFP 100 from the communication information of the MFP information and initiates communication using Bluetooth® with MFP 100. Then, in step S405, screen data for operating the process by the scan function is transmitted to MFP 100.

Upon receiving the corresponding screen data from MFP 100, in step S407, CPU 20 allows operation panel 25 to display an operation screen based on the screen data. Upon accepting an operation based on the operation screen, that is, a touch operation on the operation screen (YES in step S409 and NO in step S411), in step S413, CPU 20 transmits a signal specifying the designated position on the operation screen as an operation signal to MFP 100.

The operation thereafter returns to step S405 described above, and the following operation is repeated until the end of operation (YES in step S411). More specifically, a signal specifying the designated position on the operation screen is transmitted as an operation signal to MFP 100 every time a touch operation on the operation screen is accepted, and the next screen data is then transmitted from MFP 100. Accordingly, the operation screens for inputting the operations in the box function appear one after another in a similar manner as in FIG. 2 (3) (4), so that the operations necessary for the process by the scan function are accepted on operation panel 25 of portable terminal 200.

Effects of Embodiment

Through the operation as described above in the image processing system according to the present embodiment, MFP 100 can be operated using portable terminal 200 as described in the overall operations.

In the foregoing example, the box function and the scan function are illustrated as examples of functions of MFP 100. As the recent MFPs have been more sophisticated, even more functions are installed and available. In such a case, many options for selecting a function to be operated from those functions as well as options for operation in those functions are displayed on the operation screens appearing on operation panel 15 of MFP 100. Therefore, such operation screens are difficult to operate for the users unfamiliar with them. Moreover, since the functions installed in MFPs and the available functions vary among MFPs, the users unfamiliar with them may be unable to promptly determine whether the desired function is available in the MFP to be operated.

In such a case, in the image processing system according to the present embodiment, the user can activate the dedicated application in portable terminal 200 familiar to them and take a picture of the MFP, so that the functions available in the MFP are displayed as tags. Then, when the user selects one from those tags, the operation screen for the function to be operated appears on operation panel 25 of portable terminal 200. The user can operate MFP 100 through operation input on the screen.

Accordingly, the users can recognize the available functions at a glance and, in addition, can operate the functions easily. In addition, even when MFP 100 is located at a distance from the users, the users do not have to move there and can operate MFP 100 with portable terminal 200 they carry.

<First Modification>

In MFP 100, user authentication may be performed in using a function. Such a case will now be described as a modified embodiment.

Figure 16:
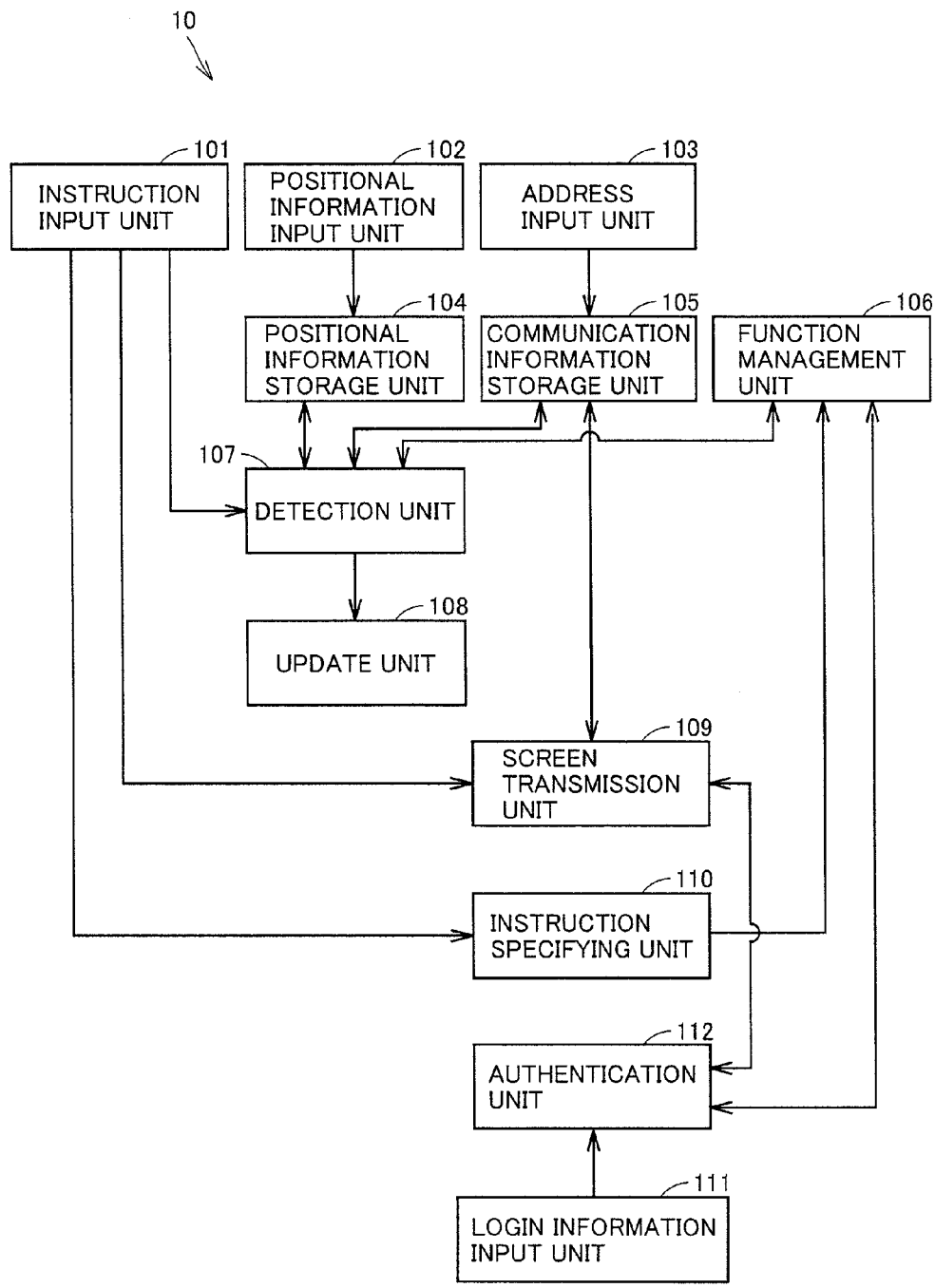
FIG. 16 is a block diagram showing a specific example of a functional configuration of the MFP according to a first modification.

FIG. 16 is a block diagram showing a specific example of a functional configuration of MFP 100 according to the modified embodiment. Each function shown in FIG. 16 is also a function mainly formed in CPU 10 when CPU 10 reads out a program stored in ROM 11 and executes the program on RAM 12. However, at least part of the functions may be formed by the hardware configuration shown in FIG. 3.

Referring to FIG. 16, as functions for implementing the operation described above, MFP 100 according to the modified embodiment further includes, in addition to the functions shown in FIG. 7, a login information input unit 111 for accepting input of login information and an authentication unit 112 for performing user authentication.

In the modified embodiment, function management unit 106 stores the installed and available functions and stores information of users permitted to use for each function, or user information that is information of the functions permitted to be used for each user.

Figure 17:
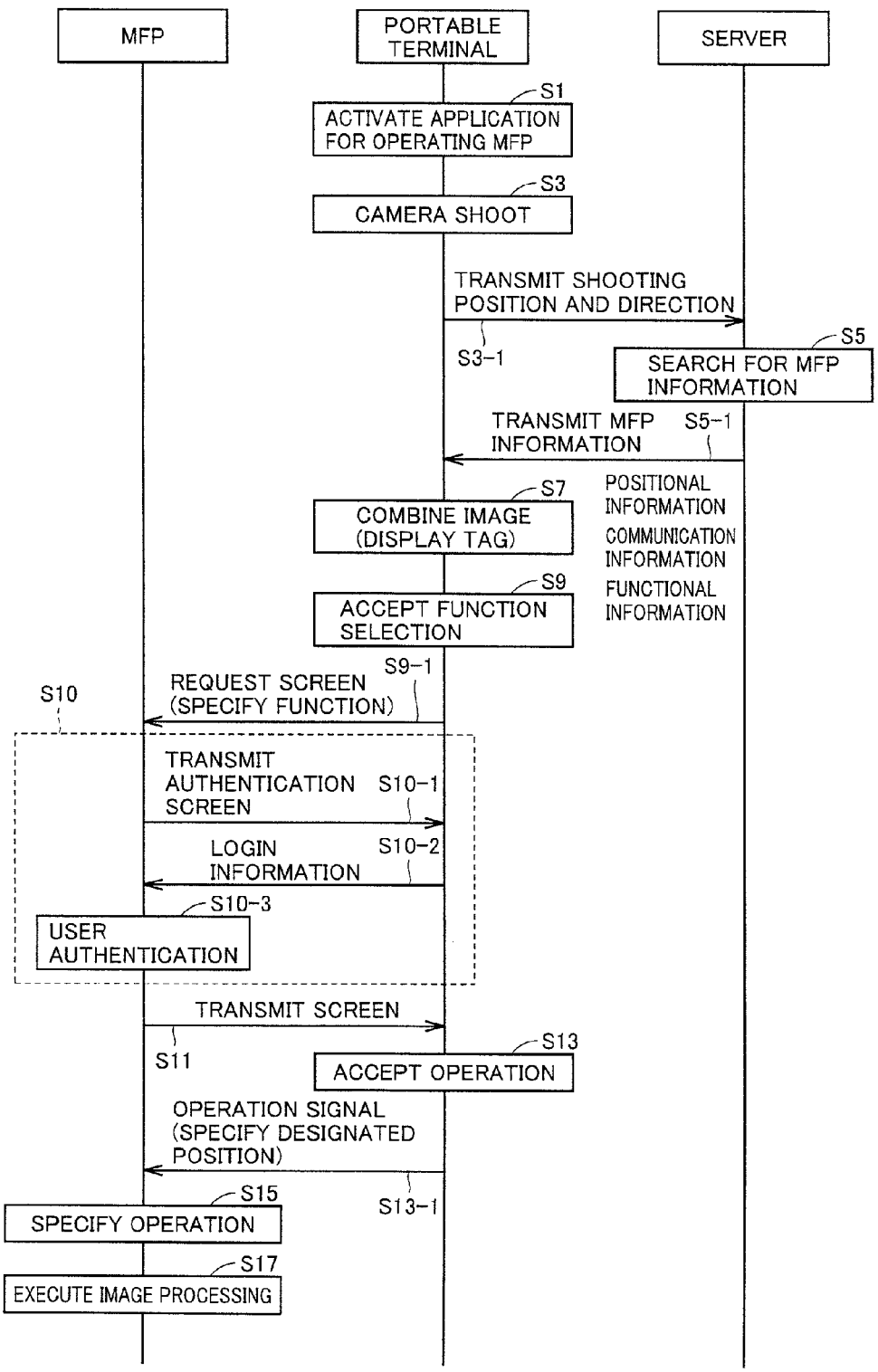
FIG. 17 is a sequence diagram illustrating a flow of an operation for operating the MFP in the image processing system according to the first modification.

FIG. 17 is a sequence diagram illustrating a flow of an operation for operating the MFP in the image processing system according to the modified embodiment. The flow of the operation illustrated in FIG. 17 differs from the flow of the operation shown in FIG. 12 in that an operation for user authentication as illustrated in step S10 is additionally performed.

Specifically, in the image processing system according to the modified embodiment, a function is selected at portable terminal 200 in step S9, and a request for a screen is given to MFP 100 together with the information that specifies the function corresponding to the tag selected in step S9-1. Then, MFP 100 determines whether the selected function requires user authentication. Then, if user authentication is required, an operation for user authentication in step S10 is performed.

More specifically, if user authentication is required, in step S10-1, MFP 100 transmits screen data for inputting login information for use in user authentication, in place of the requested screen data, to portable terminal 200. When input of login information is accepted in accordance with the screen in step S10-2, then in step S10-3, MFP 100 refers to the stored user information and determines whether to permit the use of the selected function. If it is determined that the use is permitted, that is, if user authentication is successful for the selected function, the requested screen data is transmitted to portable terminal 200 in step S11.

In this manner, a function that requires user authentication, for example, such as a box function, can also be provided with security and with enhanced operability.

Although input of login information is accepted in this modified embodiment, MFP 100 may store the correspondence between the Bluetooth® address of portable terminal 200 and user information and may perform user authentication based on the address when portable terminal 200 requests screen data from MFP 100 in step S9-1. Alternatively, in place of user authentication in this manner, authentication may be performed using a passkey (PIN code) in the communication using Bluetooth® between MFP 100 and portable terminal 200.

<Second Modification>

(Display of Performance and Status of MFP)

Server 300 stores the positional information and the functional information of MFP (the MFP list in FIG. 11) for each MFP included in the image processing system and, in addition, information indicating the performance and information indicating the status of the MFP at that moment. Then, upon receiving a request for the MFP information from portable terminal 200 (step S3-1), server 300 may transmit these information with the corresponding MFP information to portable terminal 200 in step S5-1. FIG. 19 shows exemplary information indicating the performance of MFP 100 that is stored in HD 33.

Referring to FIG. 19, the information indicating the performance of each MFP 100 is stored, for example, in the form of a table. In the table, the model number, manufacturer, print speed (the number of sheets printed per minute for monochrome and for color) of each MFP 100 are associated with the MFP name.

FIG. 20 shows a specific example of the information transmitted from server 300 to portable terminal 200 in transmission of the MFP information (S5-1) in this modification.

FIG. 20 shows an XML document. This XML document is a description enclosed in <mfpinfo> tags. This tag indicates a reply to a request for search for the MFP information from portable terminal 200.

The description in FIG. 20 includes the information specifying the shooting position and the shooting direction (information enclosed in <gps> tags and <dir> tags, respectively) that is transmitted from portable terminal 200, as described with reference to FIG. 18, and further includes the information indicating the MFP information and performance (information enclosed in <model> tags).

Specifically, the description in FIG. 20 includes the information enclosed in <main> tags for specifying the model number, the information enclosed in <maker> tags for specifying the manufacturer of MFP 100, the information enclosed in <speed> tags for specifying the speed of monochrome print, the information enclosed in <speed-c> tags for specifying the speed of color print, the information enclosed in <productid> tags for specifying the MFP name, and the information (connection information) for connecting to MFP 100. The connection information includes the IP address (information enclosed in <ipaddress> tags) and the Bluetooth® address (information enclosed in <bladdress> tags) of MFP 100.

The description in FIG. 20 further includes the information enclosed in <status> tags for specifying the status of MFP 100 at that moment. In MFP 100, it can be determined whether the MFP 100 is ready for an image processing operation (print, scan, box print, etc.) at that moment, as in existing MFPs. In this modification, MFP 100 transmits the determination result together with the MFP information to server 300. Server 300 in turn transmits the information to portable terminal 200.

CPU 30 of server 300 generates data shown in FIG. 20 based on the MFP list described with reference to FIG. 11 and the information described with reference to FIG. 19.

Figures 21, 22, 23:
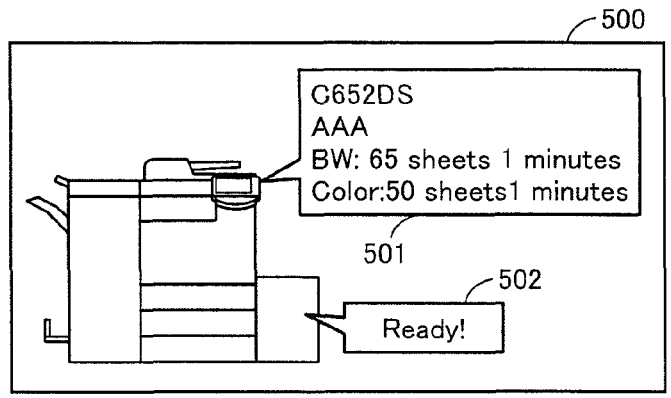
FIG. 21 is a diagram showing an exemplary screen appearing on the portable terminal in the second modification.
FIG. 22 is a diagram showing exemplary data transmitted from the portable terminal to the server in the second modification.
FIG. 23 is a diagram showing an example of screen data in the second modification.

Upon receiving the data illustrated in FIG. 20, portable terminal 200 displays the performance of the MFP together with the image shot by the camera on operation panel 25. FIG. 21 shows an example of the screen appearing at this time.

Referring to FIG. 21, a screen 500 displays the image shot by camera 26 with a screen 501 indicating the performance of MFP 100 as a search result and a screen 502 indicating the status of that MFP 100. In this modification, when an operation is made on screen 502 of operation panel 25, information requesting screen data for displaying a menu of functions of MFP 100 is transmitted to MFP 100 using the connection information obtained from server 300 (the IP address in <ipaddress> tags or the Bluetooth® address in <bladdress> tags in FIG. 20). FIG. 22 shows an example of the data transmitted from portable terminal 200 to MFP 100 at this time. The <reqmenu> tag is a tag for requesting screen data for displaying a menu.

(Display of Menu of Functions)

FIG. 22 shows that the data is the above-noted information requesting screen data of an MFP with <reqmenu> tag. Then, the <productid> tag shows the information for specifying a target MFP 100. The MFP name is described in <productid> tags.

The screen data for allowing a selection of the functions of MFP 100 is transmitted from MFP 100 to portable terminal 200 in response to the transmission of the data above from portable terminal 200.

Figure 24:
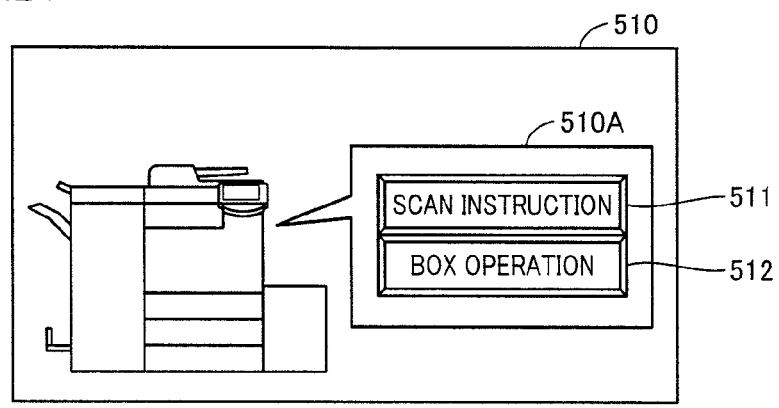
FIG. 24 to FIG. 26 are diagrams showing exemplary screens appearing on the portable terminal in the second modification.

FIG. 23 shows an example of such screen data. FIG. 24 shows an example of the screen appearing on operation panel 25 of portable terminal 200 based on such screen data.

A screen 510 in FIG. 24 displays a screen 510A for selecting a function of MFP 100, together with the image shot by camera 26.

Screen 510A includes a button 511 for selecting a print function and a button 512 for selecting a box function from the functions specified by the functional information included in the MFP information. In this modification, button 511 and button 512 are an example of the operation unit for designating a process specified by the functional information (a process executable by MFP 100).

In the description shown in FIG. 23, the information enclosed in <form> tags corresponds to the information for displaying screen 510A. Then, in that information, <INPUT type=submit value=print instruction name=btnPrint> is information for displaying button 511, and <INPUT type=submit value=box operation name=btnBox> is information for displaying button 512.

Figure 25:
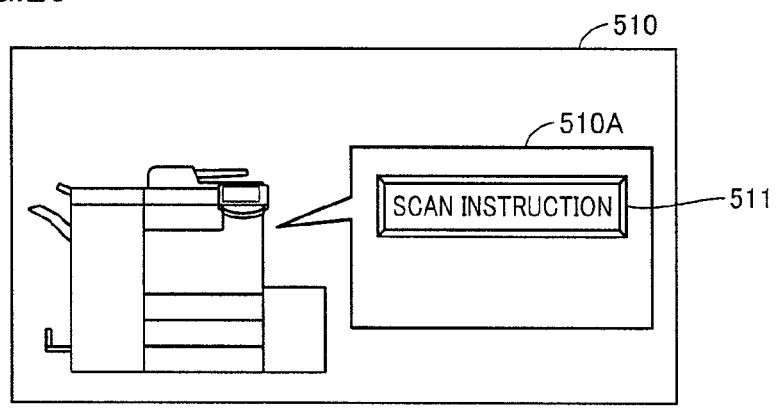

FIG. 23 is data in the case where the concerned MFP 100 has both the scan function and the box function. If the concerned MFP 100 does not have the box function, the screen data transmitted from server 300 to portable terminal 200 does not include the description <INPUT type=submit value=box operation name=btnBox>. In this case, screen 510A appearing on operation panel 25 of portable terminal 200 includes only button 511 and does not include button 512 as shown in FIG. 25.

Figure 26:
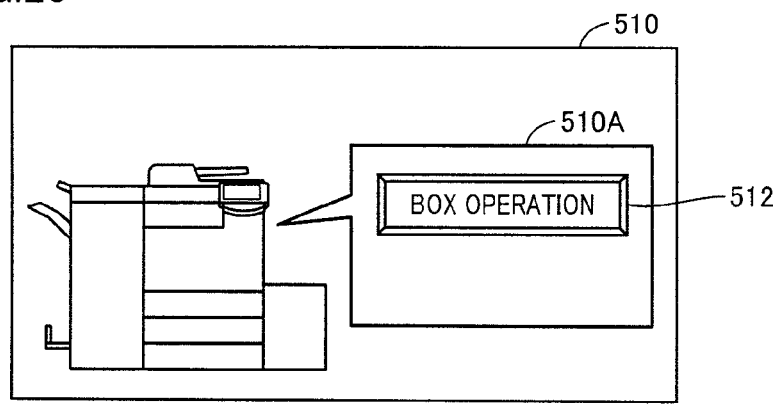

If the concerned MFP 100 does not have the scan function and only includes the box function, the screen data transmitted from server 300 to portable terminal 200 does not include the portion <INPUT type=submit value=print instruction name=btnPrint>. Thus, screen 510A appearing on operation panel 25 of portable terminal 200 includes only button 512 and does not include button 511 as shown in FIG. 26.

<Third Modification>

In the foregoing embodiment, the box function and the scan function are illustrated as the functions that portable terminal 200 can instruct MFP 110 to operate. The other functions that can be designated by potable terminal 200 may include a print function, for example. The print function is a function of MFP 100 printing a document saved in an external device and received from the external device.

Figure 27:
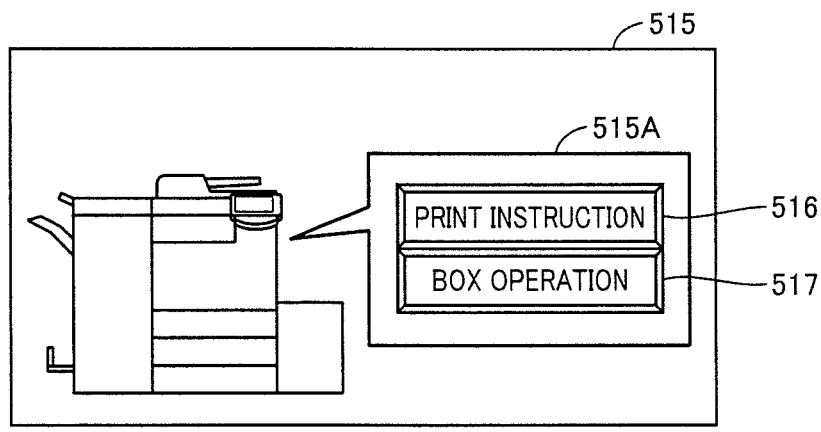
FIG. 27 is a diagram showing an exemplary screen appearing on the portable terminal in a third modification.

In this modification, a screen 515 in FIG. 27 appears on operation panel 25 in place of screen 510 in FIG. 24. Screen 515 in FIG. 27 includes a screen 515A in place of screen 510A in FIG. 24. Screen 515A displays a button 516 for selecting the print function and a button 517 for selecting the box function.

Then, at portable terminal 200, when an operation for selecting the print function is made through operation on button 516, the information for specifying the print function as well as information requesting a screen for instructing to execute the print function is transmitted from portable terminal 200 to MFP 100.

Figures 28A, 28B, 29:
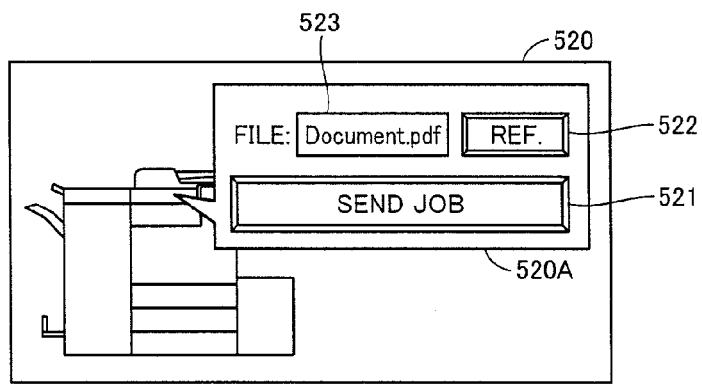
FIGS. 28A and 28B are diagrams illustrating a screen appearing on the portable terminal in the third modification.
FIG. 29 is a diagram showing exemplary data transmitted from the portable terminal to the MFP in the third modification.

MFP 100 transmits screen data for operating a process by the requested function to the requestor potable terminal 200. FIG. 28A shows an example of the screen data. FIG. 28B shows an example of the screen appearing on operation panel 25 of portable terminal 200 based on the screen data shown in FIG. 28A.

A screen 520 in FIG. 28B includes a screen 520A for operating a process by the print function, in addition to the image shot by camera 26.

Screen 520A includes a button 522 for designating a document to be processed, a display field 523 displaying information for specifying the designated document, and a button 521 for transmitting an instruction to print the designated document to MFP 100.

In the data shown in FIG. 28A, <INPUT type=file name=File value=PrintJob> and <INPUT type=submit name=Sendprt value=send job> are portions for displaying button 521. Then, the other description in FIG. 28A is data for displaying the portion other than button 521 in screen 520A.

Upon operation on button 521, the information for instructing to execute the print function on the document in display field 523 is transmitted from portable terminal 200 to MFP 100. An example of the information transmitted here is shown in FIG. 29.

In the description shown in FIG. 29, the description enclosed in <jobfile> tags is information for specifying a document to be processed by the print function. In other words, <job file> tag means that the description in FIG. 29 is data instructing MFP 100 to execute the print function. Then, in the description in FIG. 29, the portion enclosed in <filename> tags is information specifying the name of the document to be processed. The portion enclosed in <type> tags is information specifying the type of the document. Then, the portion enclosed in <data> tags is data of the document to be processed.

Upon receiving the data shown in FIG. 29, MFP 100 executes a print operation on the designated document, in accordance with the description.

<Fourth Modification>

In this modification, when the function (process) to be executed is specified in step S15 (FIG. 12), MFP 100 determines whether it can execute the function. Then, if MFP 100 determines that it cannot execute the function, MFP 100 transmits to server 300 information for asking to search for an MFP 100 different from the concerned MFP 100. In response, server 300 searches again for an MFP 100 other than the concerned MFP 100 from the MFP list in step S5 (FIG. 12).

Then, the MFP information of the search result is transmitted to portable terminal 200.

Specifically, at MFP 100, when the function to be executed is specified, function management unit 106 (FIG. 7) determines whether image formation unit 118 and image scanning unit 119 are ready for executing their functions. For example, if paper jam occurs on a paper feed path in image formation unit 118 or if paper-out occurs in MFP 100, it is determined that image formation unit 118 is not ready for executing the function. Here, whether paper jam occurs or not is determined, for example, based on a detection output from a sensor provided on a paper feed path. Whether paper-out occurs or not is determined based on a detection output from a sensor provided on a paper tray storing paper for image formation. In a case where image scanning unit 119 includes a device that automatically feeds a document to the platen, if paper jam occurs in the device, it is determined that image scanning unit 119 is not ready for executing the function. Whether such paper jam occurs or not is determined based on a detection output from a sensor provided on the paper feed path to the platen.

Then, if it is determined that image formation unit 118 is not ready for executing the function, function management unit 106 determines that the box function and the scan function are not executable. If it is determined that image formation unit 118 is ready for executing the function but it is determined that image scanning unit 119 is not ready for executing the function, it is determined that the box function is executable but the scan function is not executable.

On the other hand, if no sensor provided for image formation unit 118 and image scanning unit 119 indicates abnormality, function management unit 106 determines that all the functions are executable.

As in this modification, if the MFP 100 found based on the information specifying the shooting position and shooting direction at portable terminal 200 cannot execute the function designated from portable terminal 200, server 300 transmits the MFP information of an MFP 100 different from the concerned MFP 100, to portable terminal 200. Here, the criterion for selecting a different MFP 100 is, for example, that MFP 100 is located closest to the MFP that is initially selected as a search result. The distance between MFPs 100 can be determined based on the positional information in the MFP list.

Here, information for grouping a plurality of MFPs 100 registered in the MFP list may be further included, and, as another criterion, an MFP 100 registered in the same group as the MFP 100 initially selected as a search result may be selected.

According to this modification, even when the MFP 100 shot by the user of portable terminal 200 cannot execute the function desired by the user, an MFP 100 located in the neighborhood of that MFP 100 (or registered in the same group) is selected as the one that is to execute the function, and the MFP information thereof is transmitted to portable terminal 200.

Accordingly, even when the MFP 100 shot by portable terminal 200 cannot execute the desired function, the user of portable terminal 200 can allow an MFP 100 different from that MFP 100 in the image processing system to execute the function.

<Fifth Modification>

In this modification, when the MFP 100 found based on the information specifying the shooting position and the shooting direction at portable terminal 200 cannot execute the function designated from portable terminal 200, as described in the fourth modification, the MFP 100 itself transmits the menu information of another MFP 100 and the information for connecting to another MFP 100 (IP address, Bluetooth® address, etc.) to portable terminal 200 that has sent the instruction.

Accordingly, the user of portable terminal 200 can communicate with another MFP 100 to instruct it to execute the desired function.

The MFP 100 found as a search result may transmit, to portable terminal 200, information for instructing another MFP 100 to execute the function, in addition to the information for connecting to another MFP 100.

Thus, when a button 561 in a screen 560 is operated in portable terminal 200, the information for instructing to execute the function that originally the MFP 100 as a search result is instructed to execute is transmitted to another MFP 100. In response, another MFP 100 executes the function.

Figure 30A:
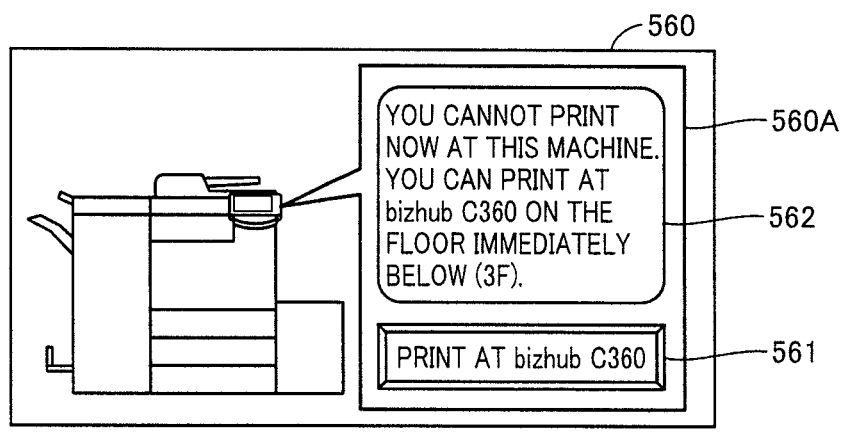
FIG. 30A is a diagram showing an exemplary screen appearing on the portable terminal in a fifth modification.

FIG. 30A shows an example of the screen appearing when the menu information and the connection information for another MFP 100 are received from the MFP 100 found based on the information specifying the shooting position and the shooting direction, in this modification.

Screen 560 in FIG. 30A displays a screen 560A, in addition to the image shot by camera 26.

Screen 560A includes a display field 562 indicating a message that the function designated from portable terminal 200 cannot be executed in the MFP 100 found as a search result, and a button 561 for connecting to another MFP 100.

Upon operation on button 561 in portable terminal 200, information requesting the MFP information is transmitted to another MFP 100. In response, another MFP 100 transmits data for displaying an image for selecting a function of another MFP 100 as shown in FIG. 2(2), to portable terminal 200. Thus, an image for selecting a function of another MFP 100 appears on operation panel 25 of portable terminal 200.

Here, another MFP 100 may be an MFP 100 installed at the location closest to the MFP 100 found based on the information specifying the shooting position and the shooting direction at portable terminal 200 or may be an MFP 100 registered in the same group as described above. Another MFP 100 may be in the outside of the image processing system.

Even when the MFP 100 found as a search result can execute the function designated from portable terminal 200, if it takes long time to execute the designated function, the MFP 100 may transmit the information for connecting to another MFP 100 as described above or information for instructing another MFP 100 to execute the function designated from portable terminal 200.

Here, whether it takes time to execute the designated function in the MFP 100 found as a search result is determined by detecting the amount of data of the job to be executed in image formation unit 118 and image scanning unit 119, and by calculating the expected time taken to complete the job to be executed, based on the amount of data.

Figure 30B:
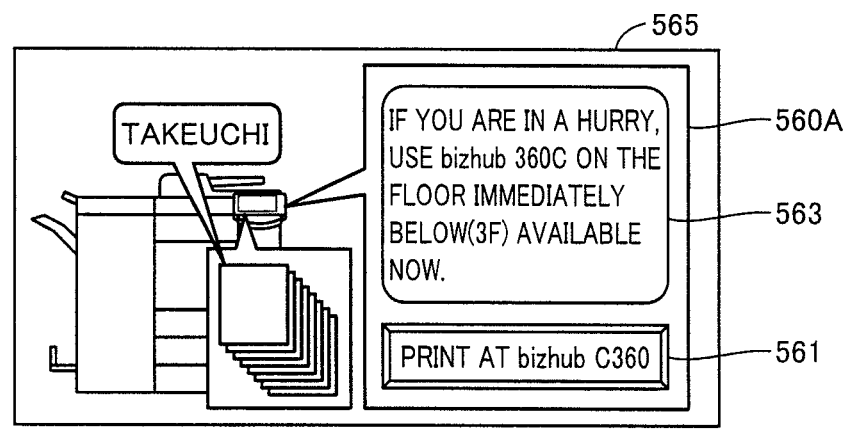
FIG. 30B is a diagram showing another exemplary screen appearing on the portable terminal in the fifth modification.

In such a case, the MFP 100 found as a search result transmits, to portable terminal 200, information for displaying a message representing that it takes time to execute the designated function or that the function is executed more promptly by instructing another MFP 100 to execute the function, as shown in display field 563 in screen 560 in FIG. 30B.

In short, in such a case, such a screen as screen 565 in FIG. 30B appears on operation panel 25 of portable terminal 200.

<Sixth Modification>

Usually, when information for instructing to execute a function is received from portable terminal 200, if a job not yet executed is registered in MFP 100, a job newly accepted for registration at that moment is executed after the already registered job. In addition to this usual function, MFP 100 in this modification has a function to generate an interrupt in a queue of the jobs already registered in MFP 100 to execute a newly accepted job.

Figure 31A:
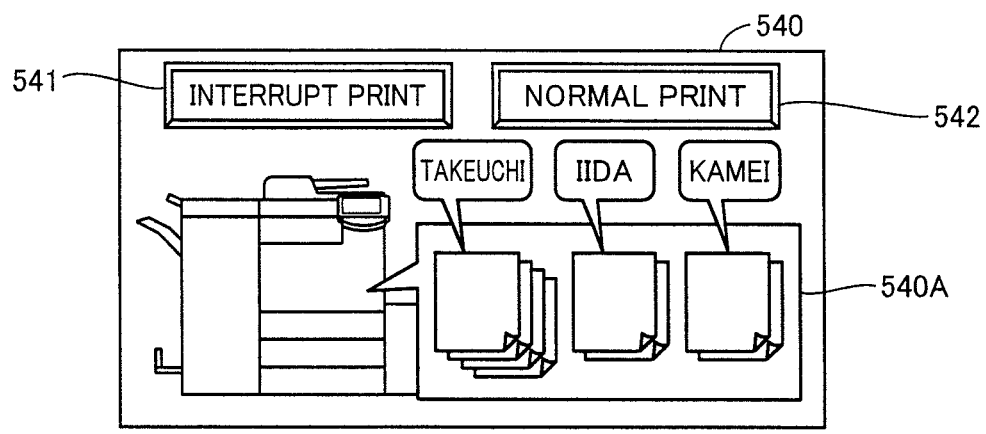
FIG. 31A is a diagram showing an exemplary screen appearing on the portable terminal in a sixth modification.

In this modification, upon receiving information for instructing to execute, for example, the box function from portable terminal 200, MFP 100 transmits, to portable terminal 200, information indicating the content of a queue of unexecuted jobs registered in MFP 100 and information for allowing the user of portable terminal 200 to select whether to execute the function designated now for execution after the registered queue or to generate an interrupt in the queue. FIG. 31A shows an example of the screen appearing on portable terminal 200 receiving these information.

Referring to FIG. 31A, a screen 540 displays an image shot by camera 26 and, in addition, a screen 540A for showing a queue of jobs registered in MFP 100, a button 542 for instructing to execute a job designated now for execution after the queue of unexecuted jobs, and a button 541 for instructing to generate an interrupt in the queue.

Upon operation on button 541 at portable terminal 200, information for instructing to generate an interrupt in the queue of jobs already registered in MFP 100 to execute the function is transmitted from portable terminal 200 to MFP 100.

Figure 31B:
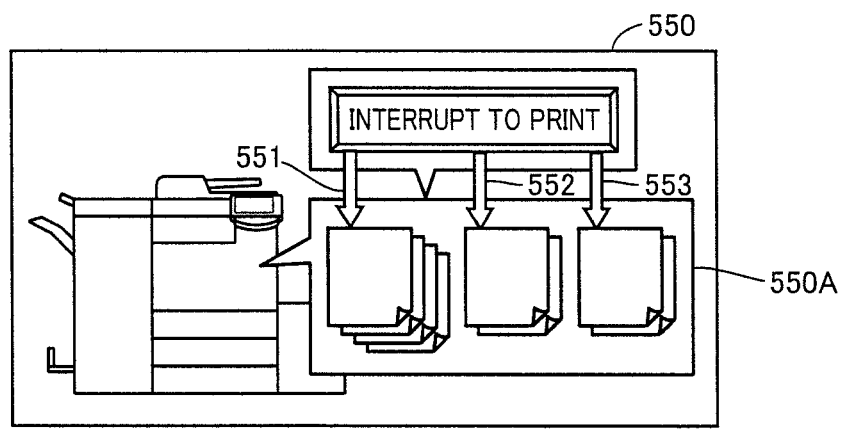
FIG. 31B is a diagram showing another exemplary screen appearing on the portable terminal in the sixth modification.

In response, information for designating an interruption point is transmitted from MFP 100 to portable terminal 200. FIG. 31B shows an example of the screen appearing on portable terminal 200 receiving the information.

Referring to FIG. 31B, a screen 550 displays an image shot by camera 26 and, in addition, a screen 550A displaying a queue of unexecuted jobs registered in MFP 100, and buttons 551 to 553 for designating an interruption point. Screen 550A is a screen displaying the same information as screen 540A in FIG. 31A.

At MFP 100, function management unit 106 stores the unexecuted jobs registered in MFP 100, for example, as shown in FIG. 32 as a job management list. The job management list is stored, for example, in memory 16. In the job management list, for each job, a job ID, a user name who registered the job, and the number of pages to be printed in the job are stored in association with each other.

Screen 540A and screen 550A display images each representing a job registered in the job list, in order in which jobs are executed (such that a job to be executed earlier is located closer to the MFP in the shot image). In screen 540A and screen 540, the image representing each job represents sheets of paper, by way of example. These images are displayed in such a manner as to include more sheets of paper images with the greater number of print pages corresponding to each page. In screen 540A and screen 540, in addition to each image, the name ("Takeuchi" "Iida" "Kamei") of the user who registered each job is displayed.

Button 551 is a button for giving an instruction from portable terminal 200 to MFP 100 to execute a job designated now for execution, prior to all the unexecuted jobs in that MFP 100.

Button 552 is a button for giving an instruction to execute a job designated now for execution, between the job registered by the user name "Takeuchi" and the job registered by "Iida" in the unexecuted jobs registered in that MFP 100.

Button 553 is a button giving an instruction from portable terminal 200 to MFP 100 to execute a job designated now for execution, between the job registered by the user name "Iida" and the job registered by the user name "Kamei," that is, immediately after completion of the jobs registered by the user name "Iida."

<Seventh Modification>

In the image processing system in the present embodiment described above, portable terminal 200 transmits information specifying the shooting position and the shooting direction to server 300 to request the corresponding MFP information, and, in response, server 300 searches for the MFP information of the MFP located in a prescribed range in the shooting direction from the shooting position of portable terminal 200 and transmits the corresponding MFP information to portable terminal 200 (step S1 to step S5-1 in FIG. 12). Then, at portable terminal 200, a tag for selecting a function is displayed, and information selecting a function is input (step S7). Then, the information specifying the function is transmitted to MFP 100 (step S9 to step S9-1).

Figure 33:
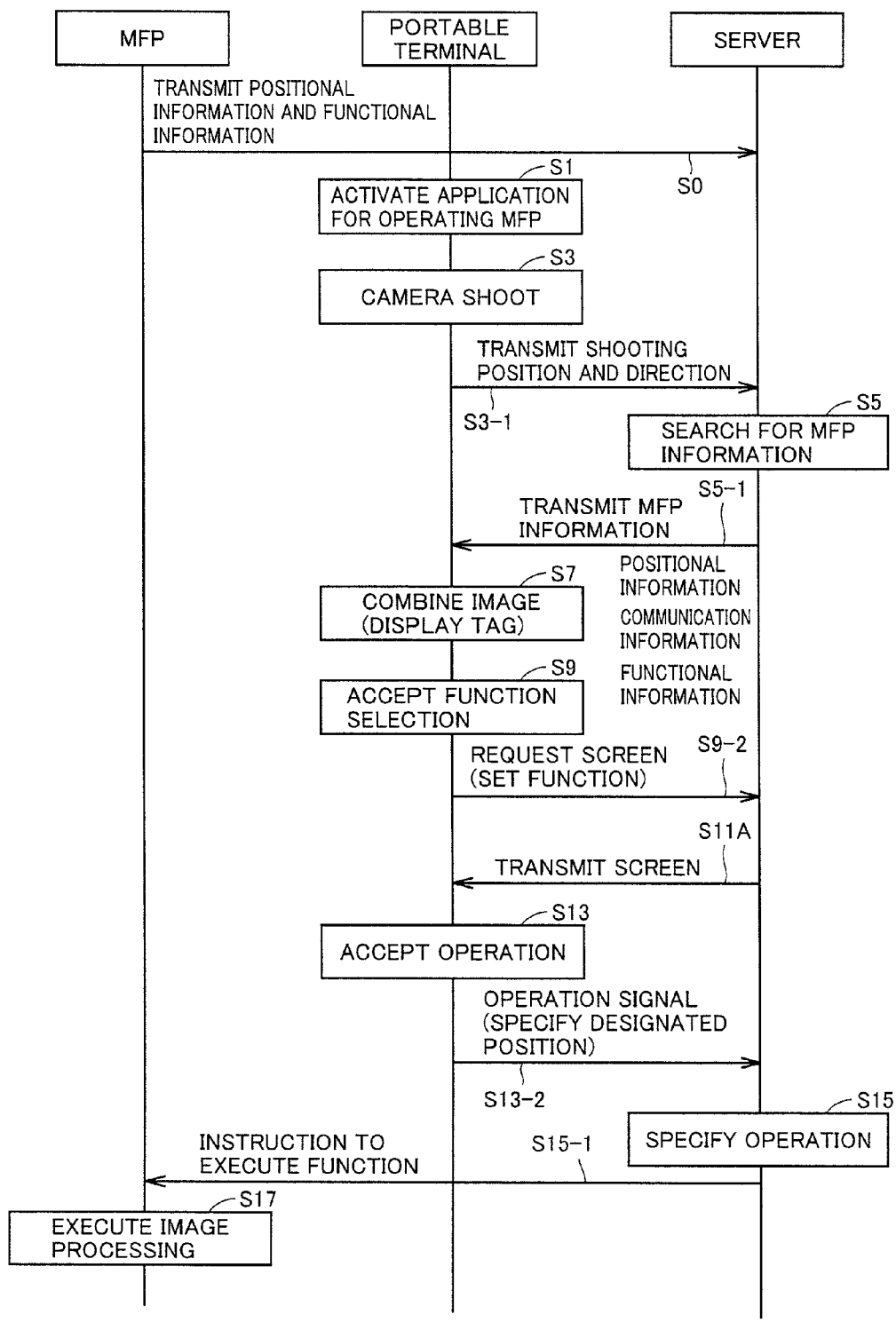
FIG. 33 is a sequence diagram illustrating a flow of an operation for operating the MFP in a seventh modification.

FIG. 33 is a sequence diagram illustrating a flow of an operation for operating the MFP in this modification. In this modification, when input of information for selecting a function of the MFP is accepted at portable terminal 200 (step S9), portable terminal 200 transmits information for specifying the function to server 300 (step S9-2).

Server 300 transmits screen data for operating a process by the requested function, to the requestor portable terminal 200 (step S11A). Thus, at portable terminal 200, a screen as shown in FIG. 2(2) appears.

Then, at portable terminal 200, a touch operation on operation panel 25 is done (step S13), and information specifying the operated position is transmitted as an operation signal to server 300 (step S13-2). The operation signal transmitted here is, for example, an operation signal specifying the designated position on operation panel 25 by a relative position to the displayed screen. As another example, in a case where the application running on portable terminal 200 includes a function of analyzing screen data from server 300, the operation content corresponding to the designated position on operation panel 25 may be specified, and an operation signal indicating the content may be transmitted to server 300.

Server 300 specifies the operation content based on the screen data transmitted to portable terminal 200 and the designated position represented by the received operation signal (step S15). Here, if an additional operation is necessary for MFP 100 to execute the selected function, screen data for the next operation screen is transmitted to portable terminal 200 in accordance with the program for executing the function of MFP 100.

The screen data transmitted here for the operation screen causes the screen, for example, as shown in FIG. 24 to appear on portable terminal 200.

Then, when all the operations necessary to execute the function are specified, server 300 transmits information for instructing to execute the function, to MFP 100 (step S15-1).

For example, when CPU 20 of portable terminal 200 accepts an operation on button 511 in screen 510A in FIG. 24, information for instructing to execute the scan function is transmitted from portable terminal 200 to server 300. In response, server 300 transmits the information for instructing to execute the scan function, to MFP 100 in step S15-1.

In this modification, button 511 and button 512 are an example of the operation unit for designating a process specified by the functional information (a process executable by MFP 100).

In response to the instruction from server 300, MFP 100 executes the function (executes image processing, step S17).

Accordingly, in this modification, when the user shoots MFP 100 using portable terminal 200 and transmits information specifying the shooting position and the shooting direction from portable terminal 200 to server 300. Then, the corresponding MFP information is transmitted from server 300 to portable terminal 200. Then, at portable terminal 200, an operation screen for instructing MFP 100 to execute the function is displayed. Then, upon operation for instructing to execute the function at portable terminal 200, information corresponding to the operation is transmitted from portable terminal 200 to server 300. In response, server 300 transmits to MFP 100 information for instructing MFP 100 to execute the function. In response, MFP 100 executes the function.

In this modification, as described with reference to FIG. 10 and FIG. 11, each of MFPs 100 constituting the image processing system transmits to server 300 the positional information and the information for the executable functions (functional information). In response, server 300 generates the MFP list as shown in FIG. 11. CPU 30 stores the generated MFP list, for example, in HD 33.

In FIG. 33, the transmission of the positional information and the functional information from MFP 100 to server 300 is shown as step S0.

In this modification, MFP 100 preferably performs the transmission of information as shown as step S0, for example, at certain time intervals. In other words, MFP 100 preferably generates the MFP information for this MFP 100 at that moment, at certain time intervals, and transmits the generated MFP information to server 300.

Then, at server 300, every time the MFP information is received from each MFP 100, CPU 30 preferably updates the information registered in the MFP list for the concerned MFP 100 in conformity with the received MFP information.

In the case where the MFP list is stored in HD 33 in server 300, for example, every time the MFP information is received from MFP 100, CPU 30 preferably updates the contents stored in the MFP list in HD 33 with those adapted to the received MFP information. Accordingly, the MFP list stored in HD 33 is updated such that the functional information for each MFP 100 reflects the status of each MFP 100 at that moment.

As a result of updating the MFP list in this manner, when the scan function cannot be executed temporarily in a certain MFP 100, for example, because of paper jam in the automatic document feeder (a device automatically conveying a document placed on a paper tray to the platen) of scanner 13, the scan function of that MFP 100 in the MFP list can temporarily be set "unavailable." This avoids a tag (button 511) for instructing to execute a function that cannot be executed by the corresponding MFP from being displayed on the screen showing the functions of the corresponding MFP as shown in FIG. 24.

Furthermore, as a result of updating the MFP list as described above, when the box function (the function of executing box print) cannot be executed temporarily because of paper out in a certain MFP 100, the box function of the MFP 100 in the MFP list can temporarily be set "unavailable." This avoids a tag (button 512) for instructing to execute a function that cannot be executed by the corresponding MFP 100 from being displayed on the screen showing the functions of the corresponding MFP as shown in FIG. 24.

Accordingly, the user's feeling of inconvenience is avoided, which would be brought about if the user instructed MFP 100 shot by portable terminal 200 to execute a function that MFP 100 cannot execute but found the function not executed in MFP 100.

<Eighth Modification>

In the foregoing seventh modification, if the MFP list registered in server 300 is not updated, MFP 100 could be instructed to execute the function temporarily not executable. In such a case, MFP 100 can ask server 300 to search for another MFP 100 again.

In this modification, when MFP 100 is instructed to execute the function temporarily not executable in an interval between updates of the MFP list, MFP 100 receiving the instruction can ask server 300 to search for another MFP 100 again, similarly.

Figure 34:
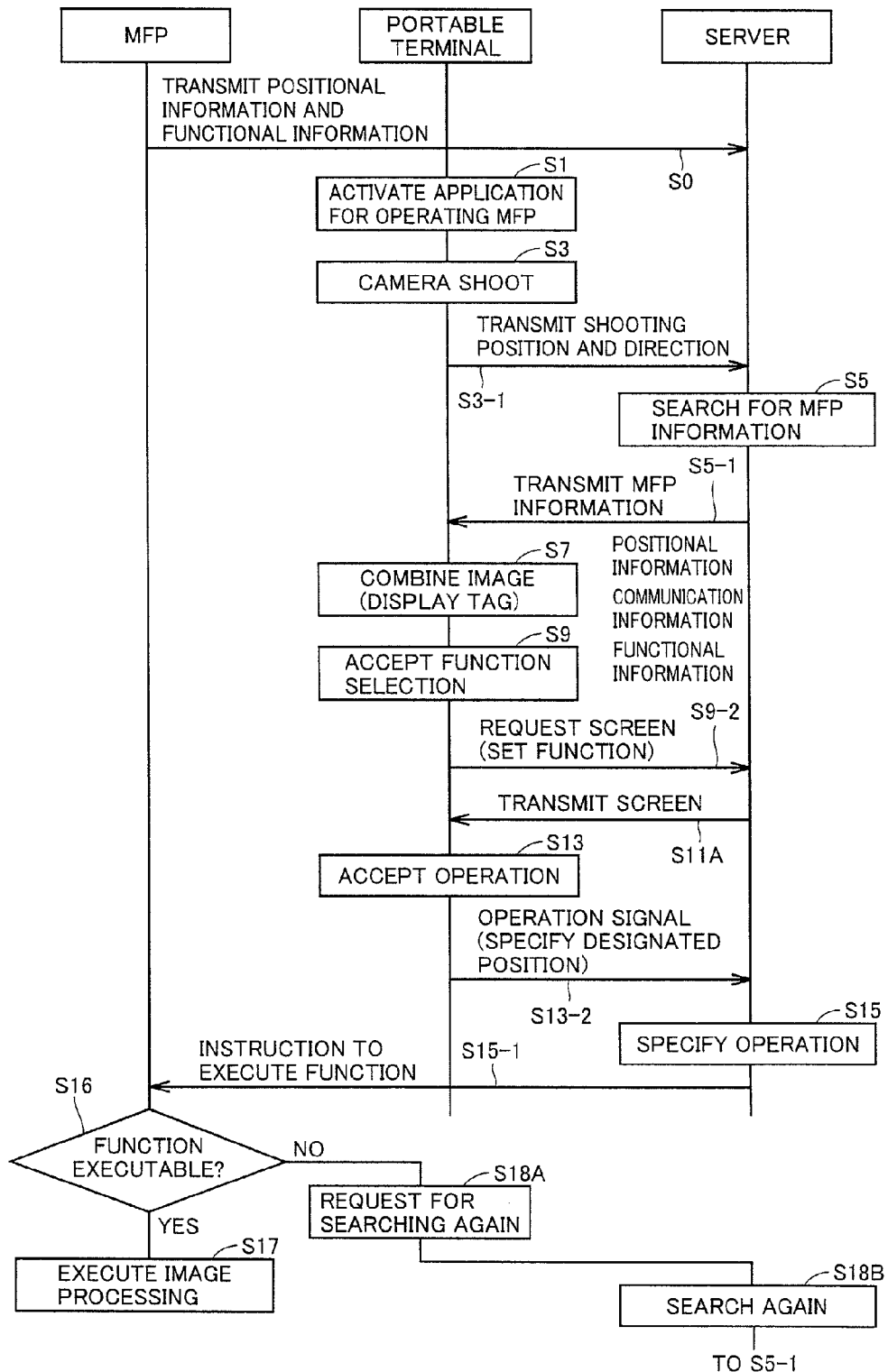
FIG. 34 to FIG. 36 are sequence diagrams illustrating a flow of an operation for operating the MFP in an eighth modification.

FIG. 34 is a sequence diagram illustrating a flow of an operation for operating the MFP in this modification.

Referring to FIG. 34, an operation content is specified in server 300, and information for instructing to execute a function is transmitted to MFP 100 (step S15-1). Then, in MFP 100, it is determined whether the designated function is executable or not (step S16). Such a determination is made by function management unit 106 as described in the fifth modification.

Then, when it is determined that the designated function is executable, the function is executed in step S17. On the other hand, if it is determined that the designated function is not executable, MFP 100 transmits, to server 300, information that the MFP 100 cannot execute the designated function by itself and information asking to search for any other MFP again (step S18A).

In response, server 300 refers to each positional information in the stored MFP list and searches for the MFP information from MFPs other than the MFP 100 that is located in a prescribed range in the shooting direction from the shooting position of portable terminal 200 and that has transmitted the information asking to search again in step S18A (step S18B).

Then, the process returns to step S5-1, and the corresponding MFP information is transmitted to portable terminal 200.

The MFP found in step S18B is preferably is the one installed in a range at a particular distance from the MFP 100 initially found (MFP 100 which is a search result in step S5), for example.

Figure 35:
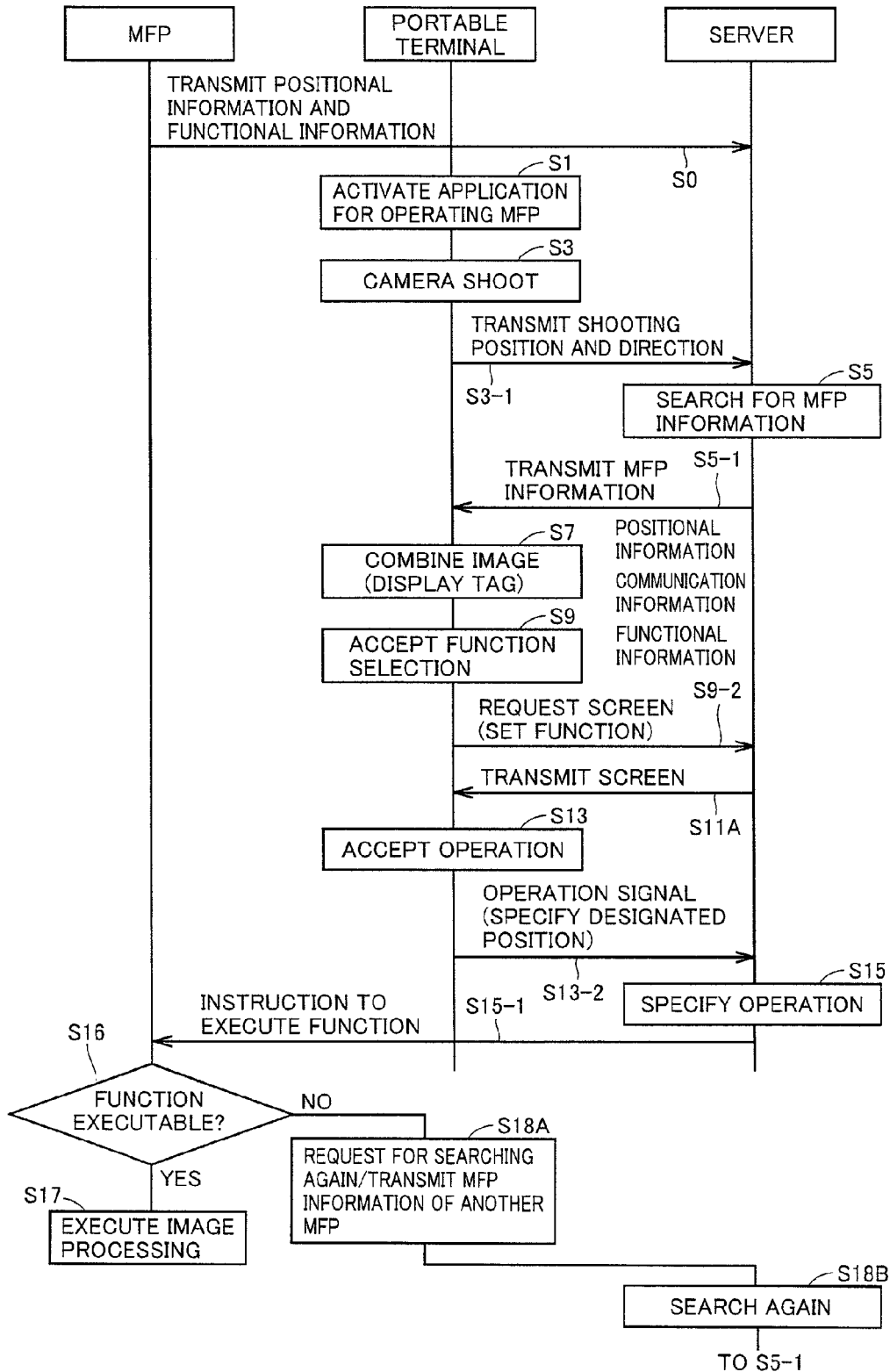

As shown in FIG. 35, MFP 100 may store the MFP information of another MFP 100, for example, in memory 16 in advance and transmit the MFP information to server 300 with a request asking for searching again, in step S18A. Thus, server 300 can add the MFP information received with the request asking for searching again to the MFP list and then search for an MFP in step S18B.

Here, another MFP 100 stored in the MFP 100 is preferably located in the neighborhood of that MFP 100. Specifically, another MFP 100 is preferably the one installed in a range at a particular distance from the concerned MFP 100 (MFP 100 initially found).

Accordingly, at server 300, even when the MFP information about another MFP located in the neighborhood is not registered in the MFP list, another MFP 100 can be output as a result of searching again.

According to such a modification, when the user shoots a certain MFP 100 by portable terminal 200 to realize a certain function at that MFP 100, and if the function cannot be executed by that MFP 100, the user can allow an MFP in the neighborhood of that MFP 100 to execute the function.

Figure 36:
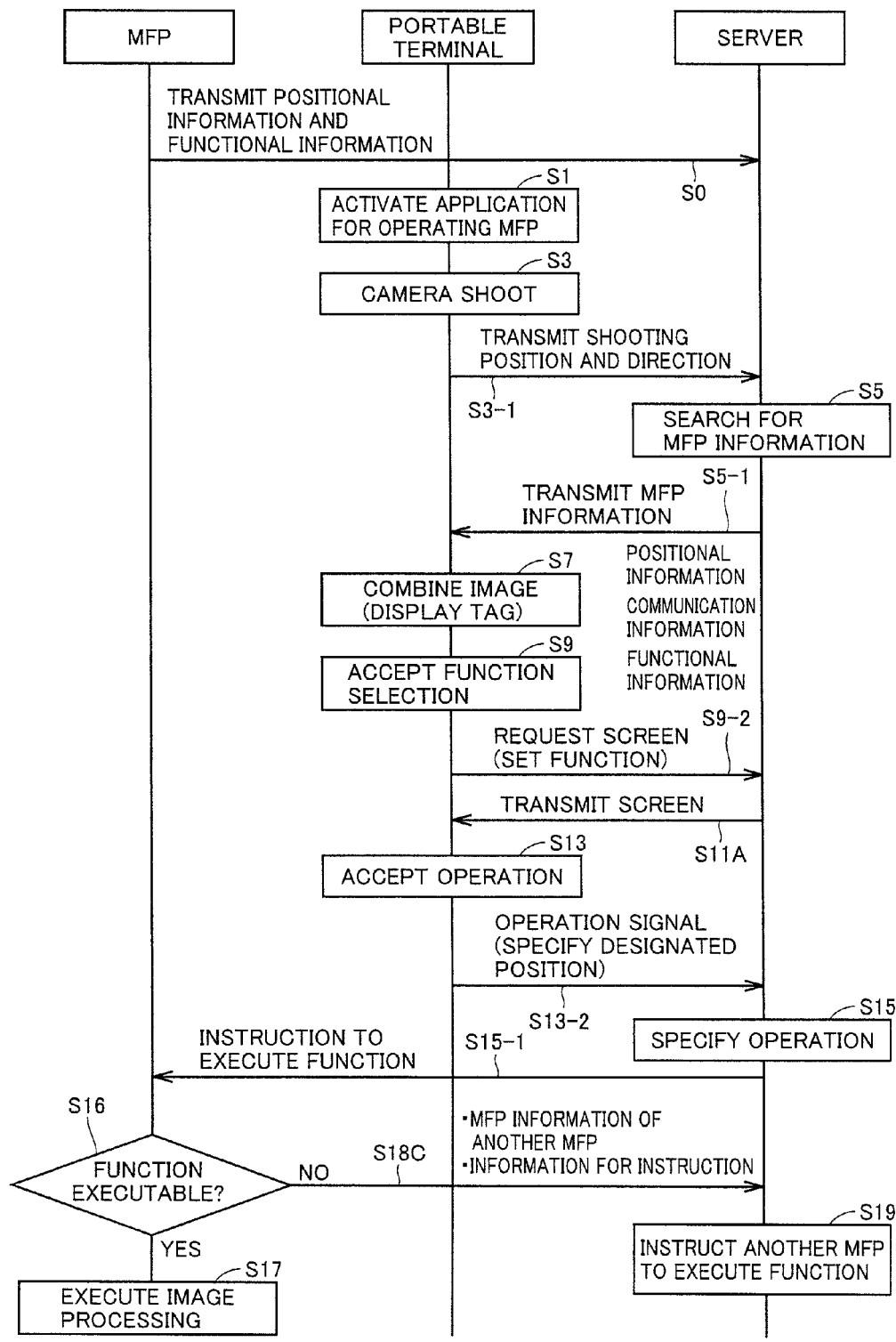

MFP 100 can also transmit the MFP information of another MFP 100 and information (information for instruction) for instructing another MFP 100 to execute the function designated for execution in step S15-1, in place of the request for searching again in step S18A. The flow of the process in this case is shown in FIG. 36.

If it is determined that the function is not executable in step S16, MFP 100 transmits the MFP information of another MFP 100 and the information for instruction to server 300 in step S18C. The information for instruction is, for example, a description written in HTML language for designating the particulars of the function.

Upon receiving these information, server 300 instructs another MFP 100 to execute the function, in step S19. It is noted that server 300 communicates with another MFP 100 using the MFP information transmitted by MFP 100 in step S18C. Then, server 300 instructs another MFP 100 to execute the function by transmitting (forwarding) the information for instruction to another MFP 100.

This allows another MFP 100 to execute the function more promptly, thereby shortening the wait time for the user of portable terminal 200.

The present invention may also provide a program for allowing MFP 100 as described above to execute the foregoing operation, a program for allowing portable terminal 200 to execute the foregoing operation, and a program for allowing server 300 to execute the foregoing operation. Such programs may be stored in a computer-readable recording medium accompanying a computer, such as a flexible disk, a CD-ROM (Compact Disk-Read Only Memory), a ROM (Read Only Memory), a RAM (Random Access Memory), and a memory card, and be provided as a program product. Alternatively, the programs may be stored in a recording medium such as a hard disk contained in a computer. The programs may be downloaded via a network.

The program in accordance with the present invention may allow the process to be executed by invoking necessary modules, among program modules provided as a part of Operating System (OS) of a computer, in a prescribed sequence at a prescribed timing. In this case, the modules are not included in the program itself and the process is executed in cooperation with OS. The program that does not include such modules may also be included in the program in accordance with the present invention.

Furthermore, the program in accordance with the present invention may be embedded in a part of another program. In this case, the modules included in another program are not included in the program itself, and the process is executed in cooperation with another program. Such a program embedded in another program may also be included in the program in accordance with the present invention.

The provided program product is installed in a program storage unit such as a hard disk for execution. It is noted that the program product includes the program itself and a recording medium encoded with the program.

According to the invention described in the foregoing embodiments, mobile users carrying portable terminals can use multifunction peripherals at places where they are.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising a portable terminal, one or more image processing apparatuses executing one or more kinds of processes, and an information processing apparatus,
   said portable terminal including
      a shooting unit,
      an obtaining unit for obtaining positional information and orientation information of said portable terminal,
      a display unit, and
      a first transmission unit for transmitting positional information and orientation information at a time of shooting by said shooting unit to said information processing apparatus,
   said information processing apparatus including
      a storage unit for storing, for each of one or more image processing apparatuses, positional information and functional information for specifying a process to be executed by the image processing apparatus,
      a search unit for searching for a specific image processing apparatus which is an image processing apparatus included in a shot image by said shooting unit of said portable terminal, from one or more image processing apparatuses stored in said storage unit, based on said positional information and orientation information at a time of shooting that is received from said portable terminal, and
      a second transmission unit for transmitting said functional information of said specific image processing apparatus to said portable terminal,
   said portable terminal further including a display control unit for allowing said display unit to display said shot image at a time of shooting by said shooting unit and a menu image including an operation unit for designating a process specified by said functional information,
   each said image processing apparatus including
      a generation unit for generating information specifying a process executable at a present time in reflection to a status of said image processing apparatus, and
      a third transmission unit for transmitting said information generated by said generation unit to said information processing apparatus,
   said information processing apparatus including an update unit for updating a stored content in said storage unit such that said functional information is associated only with said executable process received from said image processing apparatus.

2. The image processing system according to claim 1, wherein said portable terminal includes an input unit for accepting input of information, when said input unit accepts input of information to said operation unit, said first transmission unit transmits, to said information processing apparatus, first instruction information which is information for instructing to execute a process associated with said operation unit, upon receiving said first instruction information, said second transmission unit transmits, to said specific image processing apparatus, second instruction information which is information for instructing to execute a process associated with said first instruction information, said specific image processing apparatus further includes a determination unit for determining, when receiving said second instruction information, whether said specific image processing apparatus can execute a process associated with said second instruction information, if said determination unit determines that said specific image processing apparatus cannot execute the process associated with said second instruction information, said third transmission unit transmit, to said information processing apparatus, search request information which is information for asking to search for an image processing apparatus different from said specific image processing apparatus, upon receiving said search request information, said search unit searches for another image processing apparatus which is an image processing apparatus located in a specific range from said specific image processing apparatus, from said positional information of one or more image processing apparatuses, based on said positional information and orientation information at a time of shooting, and said second transmission unit transmits said functional information of said another image processing apparatus to said portable terminal.

3. The image processing system according to claim 2, wherein if said determination unit determines that said specific image processing apparatus cannot execute the process associated with said second instruction information, said third transmission unit transmits, to said information processing apparatus, positional information and said functional information of another image processing apparatus.

4. The image processing system according to claim 2, wherein if said determination unit determines that said specific image processing apparatus cannot execute the process associated with said second instruction information, said third transmission unit transmits, to said information processing apparatus, information for instructing said another image processing apparatus to execute the process associated with said second instruction information.

5. An information processing apparatus included in an image processing system configured to include a portable terminal having a shooting unit, one or more image processing apparatuses executing one or more kinds of processes, and the information processing apparatus, comprising:

a storage unit for storing, for each of one or more image processing apparatuses, positional information and functional information for specifying a process to be executed by the image processing apparatus;

a reception unit for receiving positional information and orientation information at a time of shooting by said shooting unit from said portable terminal, said reception unit receiving information specifying a process executable at a present time by each of one or more image processing apparatuses;

an update unit for updating a stored content in said storage unit such that said functional information is associated only with the process executable at a present time by each of one or more image processing apparatuses that is received by said reception unit;

a search unit for searching for a specific image processing apparatus which is an image processing apparatus included in a shot image by said shooting unit of said portable terminal, from said positional information of one or more image processing apparatuses that is stored in said storage unit, based on said positional information and orientation information at a time of shooting that is received from said portable terminal; and a transmission unit for transmitting said functional information of said specific image processing apparatus to said portable terminal.

6. A method of controlling an information processing apparatus included in an image processing system configured to include a portable terminal having a shooting unit, one or more image processing apparatuses executing one or more kinds of processes, and the information processing apparatus, comprising the steps of:

said information processing apparatus storing, for each of one or more image processing apparatuses, positional information and functional information for specifying a process to be executed by the image processing apparatus, in a storage unit, receiving positional information and orientation information at a time of shooting by said shooting unit from said portable terminal, receiving information specifying a process executable at a present time by each of one or more image processing apparatuses, updating a stored content in said storage unit such that said functional information is associated only with said received process executable at a present time for each of one or more image processing apparatuses, searching for a specific image processing apparatus which is an image processing apparatus included in a shot image by said shooting unit of said portable terminal, from said positional information of one or more image processing apparatuses that is stored in said storage unit, based on said positional information and orientation information at a time of shooting that is received from said portable terminal, and transmitting said functional information of said specific image processing apparatus to said portable terminal.

7. A non-transitory computer-readable recording medium encoded with a program for controlling a portable terminal included in an image processing system configured to include the portable terminal having a shooting unit and a display unit, one or more image processing apparatuses executing one or more kinds of processes, and an information processing apparatus, said program causing a computer of said portable terminal to obtain positional information and orientation information of said portable terminal and to transmit positional information and orientation information at a time of shooting by said shooting unit, to said information processing apparatus, wherein each said image processing apparatus generates information specifying a process executable at a present time in reflection to a status of said image processing apparatus and transmits the generated information to said information processing apparatus, said information processing apparatus stores, for each of one or more image processing apparatuses, positional information and functional information for specifying a process to be executed by the image processing apparatus, in a storage unit, updates a stored content in said storage unit such that said functional information is associated only with said executable process received from said image processing apparatus, and, upon receiving said positional information and orientation information at a time of shooting from said portable terminal, transmits, to said portable terminal, functional information for specifying a process to be executed by a specific image processing apparatus associated with said received positional information and orientation information, said program further causing said computer to display, on said display unit, a shot image at a time of shooting by said shooting unit and a menu image including an operation unit for designating a process specified by said functional information.

8. An image processing system comprising a portable terminal, one or more image processing apparatuses executing one or more kinds of processes, and an information processing apparatus, said portable terminal including
a shooting unit,
an obtaining unit for obtaining positional information and orientation information of said portable terminal,
a display unit, and
a first transmission unit for transmitting positional information and orientation information at a time of shooting by said shooting unit to said information processing apparatus, said information processing apparatus including
a first storage unit for storing, for each of one or more image processing apparatuses, positional information and connection information which is information for connecting to the image processing apparatus,
a search unit for searching for a specific image processing apparatus which is an image processing apparatus included in a shot image by said shooting unit of said portable terminal, from one or more image processing apparatuses stored in said first storage unit, based on said positional information and orientation information at a time of shooting that is received from said portable terminal, and
a second transmission unit for transmitting said connection information of said specific image processing apparatus to said portable terminal, wherein upon receiving said connection information of said specific image processing apparatus, said first transmission unit transmits, to said specific image processing apparatus, information requesting transmission of functional information for specifying a process to be executed by said image processing apparatus, using said connection information, said specific image processing apparatus including
a second storage unit for storing said functional information,
an execution unit for executing one or more kinds of processes,
a determination unit for determining whether said execution unit can execute each of said one or more kinds of processes at a present time,
an update unit for updating said second storage unit such that said functional information stored in said second storage unit is associated only with a process determined to be executable by said determination unit, and
a third transmission unit for, upon receiving said information requesting transmission of functional information, transmitting said functional information stored in said second storage unit to said portable terminal, said portable terminal further including a display control unit for allowing said display unit to display a shot image at a time of shooting by said shooting unit and a menu image including an operation unit for designating a process specified by said functional information, upon receiving said functional information.

9. The image processing system according to claim 8, wherein
said portable terminal includes an input unit for accepting input of information,
when said input unit accepts input of information to said operation unit, said first transmission unit transmits information for instructing to execute a process associated with said operation unit, to said image processing apparatus,
upon receiving said information for instructing to execute a process, said determination unit determines whether said specific image processing apparatus can execute said process as instructed,
if said determination unit determines that said specific image processing apparatus cannot execute said process as instructed, said third transmission unit transmit, to said information processing apparatus, search request information which is information for asking to search for an image processing apparatus different from said specific image processing apparatus,
upon receiving said search request information, said search unit searches for another image processing apparatus which is an image processing apparatus located in a specific range from said specific image processing apparatus, from said positional information of one or more image processing apparatuses, based on said positional information and orientation information at a time of shooting, and
said second transmission unit transmits, to said portable terminal, information for instructing said another image processing apparatus to execute said process associated with said operation unit.

10. The image processing system according to claim 9, wherein if said determination unit determines that said specific image processing apparatus cannot execute said process as instructed, said third transmission unit transmits, to said portable terminal, functional information of another image processing apparatus and information for connecting to said another image processing apparatus.

11. The image processing system according to claim 10, wherein if said determination unit determines that said specific image processing apparatus cannot execute said process as instructed, said third transmission unit transmits, to said portable terminal, information for instructing said another image processing apparatus to execute said process as instructed.

12. An image processing apparatus included in an image processing system configured to include a portable terminal, one or more image processing apparatuses executing one or more kinds of processes, and an information processing apparatus storing positional information for each of said one or more image processing apparatuses, comprising:
- a storage unit for storing functional information specifying a process to be executed by said image processing apparatus itself;
- an execution unit for executing one or more kinds of processes;
- a determination unit for determining whether said execution unit can execute each of said one or more kinds of processes at a present time;
- an update unit for updating said storage unit such that said functional information stored in said storage unit is associated only with a process determined to be executable by said determination unit; and
- a transmission unit for, upon receiving, from said portable terminal, information requesting transmission of functional information for specifying a process to be executed by said image processing apparatus, transmitting said functional information stored in said storage unit to said portable terminal,
- wherein said information processing apparatus searches for said image processing apparatus which is an image processing apparatus included in an image shot by said portable terminal, from one or more image processing apparatuses stored in said information processing apparatus, based on said positional information and orientation information of said portable terminal at a time of shooting that is received from said portable terminal.

13. An information processing apparatus included in an image processing system configured to include a portable terminal having a shooting unit, one or more image processing apparatuses executing one or more kinds of processes, and the information processing apparatus, comprising:
- a storage unit for storing, for each of one or more image processing apparatuses, positional information and connection information which is information for connecting to the image processing apparatus;
- a reception unit for receiving positional information and orientation information at a time of shooting by said shooting unit from the portable terminal;
- a search unit for searching for a specific image processing apparatus which is an image processing apparatus included in a shot image by said shooting unit of said portable terminal, from said positional information of one or more image processing apparatuses that is stored in said storage unit, based on said positional information and orientation information at a time of shooting that is received from said portable terminal; and
- a transmission unit for transmitting said connection information of said specific image processing apparatus to said portable terminal.

14. A method of controlling an image processing apparatus included in an image processing system configured to include a portable terminal, one or more image processing apparatuses, and an information processing apparatus storing positional information for each of said one or more image processing apparatuses,
said image processing apparatus including a storage unit and an execution unit executing one or more kinds of processes,
said method comprising the steps of: said image processing apparatus
storing functional information specifying a process to be executed by said image processing apparatus itself, in said storage unit,
determining whether said execution unit can execute each of said one or more kinds of processes at a present time,
updating said storage unit such that said functional information stored in said storage unit is associated only with a process determined to be executable in said step of determining, and
upon receiving, from said portable terminal, information requesting transmission of functional information for specifying a process to be executed by said image processing apparatus, transmitting said functional information stored in said storage unit to said portable terminal,
wherein said information processing apparatus searches for said image processing apparatus which is an image processing apparatus included in an image shot by said portable terminal, from one or more image processing apparatuses stored in said information processing apparatus, based on said positional information and orientation information of said portable terminal at a time of shooting that is received from said portable terminal.

15. A method of controlling an information processing apparatus included in an image processing system configured to include a portable terminal having a shooting unit, one or more image processing apparatuses executing one or more kinds of processes, and the information processing apparatus, comprising the steps of:
said information processing apparatus
storing, for each of one or more image processing apparatuses, positional information and connection information which is information for connecting to the image processing apparatus,
receiving, from said portable terminal, positional information and orientation information at a time of shooting by said shooting unit,
searching for a specific image processing apparatus which is an image processing apparatus included in a shot image by said shooting unit of said portable terminal, from said positional information of one or more image processing apparatuses, based on said positional information and orientation information at a time of shooting that is received from said portable terminal, and
transmitting said connection information of said specific image processing apparatus to said portable terminal.

16. A non-transitory computer-readable recording medium encoded with a program for controlling a portable terminal in an image processing system configured to include the portable terminal having a shooting unit and a display unit, one or more image processing apparatuses executing one or more kinds of processes, and an information processing apparatus,
said program causing a computer of said portable terminal to obtain positional information and orientation information of said portable terminal and to transmit, to said information processing apparatus, positional information and orientation information at a time of shooting by said shooting unit,
wherein upon receiving said positional information and orientation information at a time of shooting from said portable terminal, said information processing apparatus transmits, to said portable terminal, connection information which is information for connecting to a specific image processing apparatus associated with said positional information and orientation information,
upon receiving said connection information of said specific image processing apparatus, said program causing said computer to transmit, to said specific image processing apparatus, information requesting transmission of functional information for specifying a process to be executed by said specific image processing apparatus, wherein said specific image processing apparatus stores said functional information of the apparatus itself, determines whether it can execute each of said one or more kinds of processes at a present time, updates a stored content of said functional information of the apparatus itself so as to be associated only with a process determined to be executable by the apparatus itself, and, upon receiving information requesting transmission of said functional information, transmits stored said functional information to said portable terminal, upon receiving said functional information, said program further causing said computer to display, on said display unit, a shot image at a time of shooting by said shooting unit and a menu image including an operation unit for designating a process specified by said functional information.

* * * * *